(12) United States Patent
Yang et al.

(10) Patent No.: US 12,358,804 B2
(45) Date of Patent: Jul. 15, 2025

(54) EXTRACTION SYSTEM, EXTRACTION METHOD FOR SEPARATING MAGNESIUM AND EXTRACTING LITHIUM FROM MAGNESIUM-CONTAINING BRINE WITH SECONDARY AMIDE-TYPE SOLVENT AS WELL AS APPLICATIONS THEREOF

(71) Applicant: XIANGTAN UNIVERSITY, Hunan (CN)

(72) Inventors: Lixin Yang, Hunan (CN); Cong Li, Hunan (CN); Chang Liu, Hunan (CN); Zhiqiang Li, Hunan (CN); Rujun Peng, Hunan (CN); Haibo Li, Hunan (CN)

(73) Assignee: XIANGTAN UNIVERSITY, Hunan (CN)

( * ) Notice: Subject to any disclaimer, the term of this patent is extended or adjusted under 35 U.S.C. 154(b) by 721 days.

(21) Appl. No.: 17/576,929

(22) Filed: Jan. 15, 2022

(65) Prior Publication Data

US 2022/0135415 A1    May 5, 2022

Related U.S. Application Data

(63) Continuation-in-part of application No. PCT/CN2020/079076, filed on Mar. 13, 2020.

(51) Int. Cl.
*C01D 15/08*    (2006.01)
*C01D 15/04*    (2006.01)
(Continued)

(52) U.S. Cl.
CPC ............. *C01D 15/08* (2013.01); *C01D 15/04* (2013.01); *C22B 3/26* (2021.05); *C22B 26/12* (2013.01); *C22B 26/22* (2013.01); *C25B 1/34* (2013.01)

(58) Field of Classification Search
CPC ............ C22B 3/26; C22B 26/12; C01D 15/00
See application file for complete search history.

(56) References Cited

U.S. PATENT DOCUMENTS 3,846,492 A * 11/1974 Norell ................... C07C 231/06
564/123
5,391,578 A * 2/1995 Steltenkamp ....... D06M 13/402
514/625

FOREIGN PATENT DOCUMENTS

CN    108018436 A * 5/2018

OTHER PUBLICATIONS

Separation of Lithium From Brines, Bariş Erdoğan, Feb. 2015, The Graduate School of Natural and Applied Sciences of Middle East Technical University (Year: 2015).*

(Continued)

*Primary Examiner* — Daniel C. McCracken
*Assistant Examiner* — Joshua Maxwell Speer
(74) *Attorney, Agent, or Firm* — Li & Cai Intellectual Property (USA) Office

(57) ABSTRACT

The secondary amide contained in the extraction system consists of a single compound or a mixture of two or more compounds, wherein $R_1$ is selected from a C2~C12 alkyl, or a C3~C12 cycloalkyl containing a single-ring structure, $R_2$ is selected from a C1~C11 alkyl, or a C3~C11 cycloalkyl containing a single-ring structure; the total number of carbon atoms in the molecule is 12~18. With a volume ratio of an organic phase and a brine phase being 1~10:1, at a brine density of 1.25~1.38 g/cm$^3$ and at a temperature of 0~50° C., a single-stage or multi-stage countercurrent extraction and a stripping are conducted to obtain a water phase with a low magnesium-lithium ratio, which is subjected to concentration, impurity removal and preparation to get lithium chloride, lithium carbonate and lithium hydroxide respectively.

(Continued)

Water is used for stripping, greatly reducing the consumption of acid and base, and the separation process is shortened.

10 Claims, 1 Drawing Sheet

(51) Int. Cl.
*C22B 3/26* (2006.01)
*C22B 26/12* (2006.01)
*C22B 26/22* (2006.01)
*C25B 1/34* (2006.01)

(56) References Cited

OTHER PUBLICATIONS

Chemeo, Chemical Properties of Propanamide, N-butyl-2-methyl, https://www.chemeo.com/cid/38-986-6/Propanamide-N-butyl-2-methyl (Year: 2007).*

Baris Erdogan, Separation of Lithium From Brines, Feb. 2015, a Thesis Submitted to the Graduate School of Natural and Applied Sciences of Middle East Technical University (Year: 2015).*

* cited by examiner

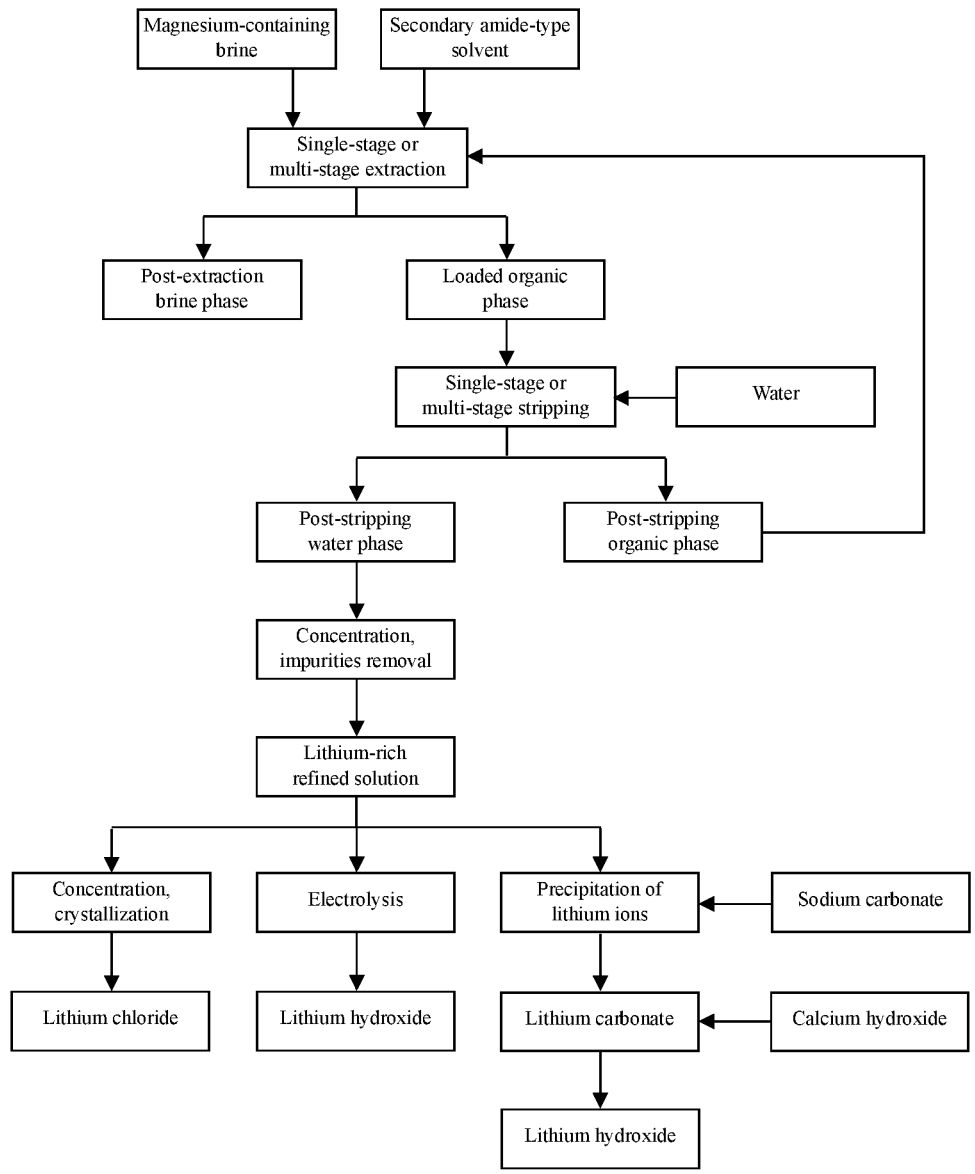

EXTRACTION SYSTEM, EXTRACTION METHOD FOR SEPARATING MAGNESIUM AND EXTRACTING LITHIUM FROM MAGNESIUM-CONTAINING BRINE WITH SECONDARY AMIDE-TYPE SOLVENT AS WELL AS APPLICATIONS THEREOF

TECHNICAL FIELD

The disclosure relates to a method for extracting lithium from magnesium-containing brine, and specifically relates to an extraction system and an extraction method for separating magnesium and extracting lithium from magnesium-containing brine through solvent extraction, as well as applications thereof.

BACKGROUND

Since this century, the application of lithium in the field of new energy has reached an unprecedented and shocking degree both in depth and breadth. Thousands of batteries are used as the power source of electric vehicles, tens of thousands of batteries are integrated into a combined structure of the energy storage device, and the use of lithium material in 3C products is also increasingly widespread and popular, therefore the demand for lithium is increasing with the day. As the key positive and negative pole materials and electrolyte raw materials in batteries, it is very important to obtain lithium from natural resources. According to the American Mineral Yearbook 2019, Australia, Chile, China and Argentina are the world's largest producer and depositor of lithium ore. China has both brine-type and hard rock-type lithium deposits, wherein the amount of salt lake lithium resources accounts for about 80% of the domestic reserves, the proven reserves of lithium salt resources in the Chaidamu basin of Qinghai province have reached up to 19.82 million tons (in terms of LiCl) [Wu Qian, Liu Xifang, Zheng Mianping, et. al., Modern Chemical Industry, 2017, 37(5), 1-5].

However, the brine lithium resources in China are significantly different from the salt lake brine resources in the Lithium Triangle region of South America. In addition to the carbonate-type brine in Zabuye Salt Lake of Tibet, a large number of magnesium sulfate-subtype and magnesium chloride-type brines are also distributed in various regions of China. But it is very difficult to extract lithium from these brines, and a large amount of magnesium salt needs to be removed due to the coexistence of lithium and magnesium. There has been a lack of particularly effective method for separating lithium from magnesium for a long time. At present, the production technologies for the exploitation of lithium resources in Qinghai Salt Lake mainly include the following 4 methods: ion adsorption, calcination leaching, membrane separation and solvent extraction, each of these technologies has defects to varying degrees. Wherein, the extraction method is to utilize the special extractive property of organic solvent on lithium to realize the purpose of separating lithium from magnesium, which is considered as the most promising method for extracting lithium from brines with high magnesium-lithium ratio [Song J. F., Nghiem L. D., Li X. M., He T. Environ. Sci.: Water Res. Technol., 2017, 3(4), 593-597], wherein the quality of extractant is the key factor in its technical process. A system in which tributyl phosphate (TBP) is used as the extractant and $FeCl_3$ is used as the co-extractant has been continuously and widely studied. In the authorized Invention Patent CN105039743B, Ji Lianmin et al. utilized a composite extractant consisting of TBP and a surfactant to reduce the equipment corrosion, the solution loss of the extractant and the degradation in an acidic environment. In multiple Chinese Patent Application Nos. 201610383061.X and 201610560041.5, Yuan Chengye et al. utilized neutral phosphooxygen compounds in combination with different tertiary amides or solely utilized tertiary amides as extractants to improve the extraction rate of lithium from brines under the coextraction of iron salts, but the loaded organic phase still required concentrated hydrochloric acid for stripping. Extraction of lithium from salt lake brines has been studied deeply by Meng Qingfen et al. using pyrrole hexafluorophosphate ionic liquid (CN106498184B) and phosphate ester ionic liquid (CN108866352A) as the extractants or by Zhao Penglong et al. using N, N-disubstituted sulfonamides (CN106435219B) and unsaturated hydrocarbon tertiary amides (CN106044803B) as the extractants.

However, in general, the large-scale test verification and screening of extractants have not been completed for the extraction method, and the most suitable extraction system has not been found so far. There is always a contradiction between extraction and stripping and a contradiction of acid and base consumption in the technology of extracting lithium by solvent extraction. If these contradictions cannot be solved fundamentally, the solvent extraction is unlikely to be a competitive method, and this ultimately depends on the development of extraction systems and extraction technologies. After salt lake brines with high magnesium-lithium ratio are transformed to brines with low magnesium-lithium ratio through lithium magnesium separation, the basic chemical products needed in the market such as lithium chloride, lithium carbonate and lithium hydroxide can be prepared.

SUMMARY

To address the defects existing in the prior art, the disclosure aims to provide an economical and effective extraction system and extraction method for separating magnesium and extracting lithium from magnesium-containing brine with a secondary amide-type solvent, as well as applications thereof.

The disclosure provides technical schemes and processes as below:

1. An extraction system for separating magnesium and extracting lithium from magnesium-containing brine with a secondary amide-type solvent, the extraction system contains secondary amides; the secondary amides consist of a single compound or a mixture of two or more compounds; wherein, the single compound has a structure as shown in Formula (I):

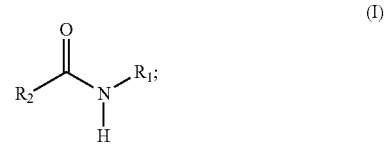

(I)

Wherein, $R_1$ is selected from a C2~C12 alkyl or a C3~C12 cycloalkyl containing a single-ring structure, $R_2$ is selected from a C1~C11 alkyl or a C3~C11 cycloalkyl containing a single-ring structure, and the sum of the number of carbon atoms contained in the two groups $R_1$ and $R_2$ is 11~17, wherein the alkyl or the cycloalkyl comprises various isomers (because $R_1$ and $R_2$ are variable, so when $R_1$ and $R_2$ are well-determined, the extraction system is a single compound, while the mixture means a substance mixed by two or more compounds generated as a result of the variations of $R_1$ and $R_2$);

And, the extraction system containing the secondary amide has a freezing point less than 0° C. (the freezing point of the single component constituting the extraction system may be less than, equal to or greater than 0° C.; when the freezing point of the single component is less than 0° C., namely it can satisfy the condition of extraction system as the invention; when the freezing point of the single component is greater than or equal to 0° C., it is likely to mix with other components with a freezing point less than 0° C. to dissolve and eventually form a mixture with a freezing point less than 0° C.).

In the extraction system, the secondary amide accounts for a volume percentage of 40~100%, including two endpoint values.

In the extraction system formed from a mixture of two or more compounds only consisting of a single compound of the secondary amide, under the condition that the components of the system are miscible with each other, the volume percentage of any compound can be adjusted at will.

2. An extraction method for separating magnesium and extracting lithium from magnesium-containing brine with a secondary amide-type solvent, comprising the following steps:
   S1. The magnesium-containing brine is taken as a pre-extraction brine phase; wherein, in the magnesium-containing brine, the concentration of lithium ions is 0.1~21 g/L, the concentration of magnesium ions is 80~125 g/L, the concentration of chloride ions is 200~400 g/L, the mass ratio of magnesium to lithium is 4.8~1100:1, the density of brine at 20° C. is 1.25~1.38 g/cm³, and the pH value of the brine is between 1 and 7;
   S2. The extraction system of the above 1 is taken as a pre-extraction organic phase;
   S3. The pre-extraction organic phase and the pre-extraction brine phase are mixed at a volume ratio of 1~10:1, and subjected to a single-stage extraction or a multi-stage countercurrent extraction, then subjected to a two-phase separation to get a loaded organic phase and a post-extraction brine phase.

The magnesium-containing brine also comprises one or two or more of sodium ions, potassium ions, ferric ions, ferrous ions, sulfate radicals, boric acid or borate ions.

The magnesium-containing brine comprises lithium-containing salt lake brine, but not limited to such a kind of brine.

Further, in the step S3, the extraction temperature is 0~50° C.; the two phases are mixed with stirring; after the extraction, the two phases are separated by centrifugation or settlement.

Further, after the step S3, it further comprises the following steps:
   S4. With water as a stripping agent, the loaded organic phase is subjected to a single-stage stripping or a multi-stage countercurrent stripping, the ratio of stripping phases, i.e., the volume ratio of the stripping agent to the loaded organic phase, is 1:1~20, then the two phases are separated to get a post-stripping organic phase and a post-stripping water phase;
   S5. The post-stripping organic phase is returned to the step S2 to realize the recycling of the extractant.

Further, in the step S4, the stripping temperature is 0~50° C.; the two phases are mixed with stirring; after the stripping, the two phases are separated by centrifugation or settlement.

3. An application of the extraction method for separating magnesium and extracting lithium from magnesium-containing brine with a secondary amide-type solvent in obtaining a lithium product lithium chloride, wherein, after the step S4, it further comprises the following steps:
   S6. The post-stripping water phase is further purified through oil removal, and concentrated; then an agent for removing impurities is added to remove the sulfate radicals and remaining magnesium ions therein, to get a lithium chloride solution after refining of the water phase; the agent for removing impurities is one or two or more of calcium oxide, calcium hydroxide, calcium chloride, barium chloride, sodium carbonate, sodium oxalate or sodium hydroxide;
   S7. The refined lithium chloride solution is subjected to concentration, crystallization, separation and drying to produce a lithium chloride product.

4. An application of the extraction method for separating magnesium and extracting lithium from magnesium-containing brine with a secondary amide-type solvent in obtaining a lithium product lithium carbonate, wherein, after the step S4, it further comprises the following steps:
   S6. The post-stripping water phase is further purified through oil removal, and concentrated; then an agent for removing impurities is added to remove the sulfate radicals and remaining magnesium ions therein, to get a lithium chloride solution after refining of the water phase; the agent for removing impurities is one or two or more of calcium oxide, calcium hydroxide, calcium chloride, barium chloride, sodium carbonate, sodium oxalate or sodium hydroxide;
   S8. To the refined lithium chloride solution is added sodium carbonate to get a lithium carbonate precipitate, which is separated and dried to produce a lithium carbonate product.

5. An application of the extraction method for separating magnesium and extracting lithium from magnesium-containing brine with a secondary amide-type solvent in obtaining a lithium product lithium hydroxide, wherein, after the step S4, it further comprises the following steps:
   S6. The post-stripping water phase is further purified through oil removal, and concentrated; then an agent for removing impurities is added to remove the sulfate radicals and remaining magnesium ions therein, to get a lithium chloride solution after refining of the water phase; the agent for removing impurities is one or two or more of calcium oxide, calcium hydroxide, calcium chloride, barium chloride, sodium carbonate, sodium oxalate or sodium hydroxide;
   S9. The refined lithium chloride solution is subjected to electrolysis, to produce a lithium hydroxide product; meanwhile the byproducts hydrogen gas and chlorine gas can be used in the production of hydrochloric acid;
   Or after the step S6, it further comprises the following steps:
   S8. To the refined lithium chloride solution is added sodium carbonate to get a lithium carbonate precipitate, which is separated and dried to produce a lithium carbonate product;
   S10. To the obtained lithium carbonate is added a calcium hydroxide emulsion for a solid-liquid reaction, then separated to get a lithium hydroxide solution, which is concentrated, crystallized and dried to produce a lithium hydroxide product.

The secondary amide compounds used in the embodiments of the invention are derived from the stoichiometric reaction of organoacyl chlorides or anhydrides with primary amines, which are washed with water and purified by distillation at reduced pressure, then detected and evaluated with U.S. Agilent 7890A/5975C type gas chromatography-mass spectrometer.

Compared with the prior art, we have found in the disclosure that by employing the substance of secondary mono-amide as shown in Formula (I) as a completely new extraction system, a completely new extraction method for separating magnesium and extracting lithium from magnesium-containing brine and its application can be therefore obtained, achieving unexpected effects. There have been no documents reporting about using a secondary amide as an extraction system for extracting lithium from brines, thus providing a new technology for the current exploitation of lithium resources in salt lake brine with high magnesium-lithium ratio. The disclosure has the following beneficial effects:

1) The secondary amide extractants have simple molecular structures, they are easily available and easy to produce. Wherein, the secondary amide functional groups are the key locations for lithium-magnesium separation and lithium extraction. The hydrogen atom in N—H shifts towards the low field in the pre- and post-extraction $^1$H NMR spectrum, playing an important role in the extraction of $Li^+$. It is also observed in the pre- and post-extraction FT-IR spectrum that the stretching vibration absorption peak of N—H in the secondary amide moves towards the direction of lower wave number. This extraction is not a strong chemical bonding effect, but a weak interaction between molecules and ions.

2) Under the premise of ensuring a certain single-stage extraction capacity of $Li^+$, the loaded organic phase can be easily stripped with water directly. There is no need to use acid to enhance the stripping of $Li^+$, meanwhile there is also no need to use base to neutralize the previous acid to restore the extraction capacity of the organic phase and the acidity-alkalinity of the water phase, thus greatly reducing the consumption of acid and base during the lithium-magnesium separation of brine, achieving the bidirectional equilibrium between extraction and stripping processes, and making it easy to perform the extraction of $Li^+$ and the stripping of $Li^+$ at the same time. Upon multi-stage countercurrent extraction, the magnesium-containing brine will have a large separation coefficient of lithium and magnesium, and after stripping, the mass ratio of magnesium to lithium in the water phase is significantly reduced.

3) The whole process of extraction and separation is greatly simplified, the organic phase can be recycled directly, there is low corrosion to the equipment, and the production process is easy to control. The organic phase has a low density, which is suitable for the two-phase separation when water is used to strip the loaded organic phase. Through adjusting the molecular structure and the number of carbon atoms of the extractant, the preferred extractant will have a significantly reduced solubility in water compared with that of TBP.

BRIEF DESCRIPTION OF DRAWINGS

FIG. 1 is the process flow diagram showing an extraction system and an extraction method for separating magnesium and extracting lithium from magnesium-containing brine with a secondary amide-type solvent, and applications thereof according to the invention.

Table 40 shows the common designations, corresponding Canonical Names and codes of secondary amides referred in the embodiments of the invention.

Table 41 shows the common designations, corresponding Canonical Names and CAS Nos of synergistic extractants referred in the embodiments of the invention.

DETAILED DESCRIPTION OF EMBODIMENTS

The disclosure will be further illustrated below in combination with embodiments:

Embodiment 1

In brine from a salt lake in the Chaidamu basin of Qinghai province, the contents of $Li^+$ and $Mg^{2+}$ were 2.00 g/L and 113.43 g/L respectively, the mass ratio of magnesium to lithium was 56.67:1, wherein the contents of $Na^+$, $K^+$, $Cl^-$, $SO_4^{2-}$ and $B_2O_3$ were 3.83, 1.60, 325.98, 44.00 and 8.14 g/L respectively, the density of brine was 1.34 g/cm$^3$, and the pH value of the brine was 4.3. 10 mL of this brine was added into a 100 mL ground conical flask, into which was then added 30 mL N-octyl isobutyramide as the extractant, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the extraction rate E, the stripping rate S, the distribution ratio D and the separation coefficient of lithium and magnesium β, with the results being shown in Table 1.

TABLE 1

Two-phase separation profile of $Li^+$ and $Mg^{2+}$ in the brine of a salt lake in Qinghai province by a solvent of N-octyl isobutyramide*

| | T/° C.[a] | O/A[b] | E($Li^+$)/%[c] | E($Mg^{2+}$)/%[d] | D($Li^+$)[e] | D($Mg^{2+}$)[f] | β($Li^+$/$Mg^{2+}$)[g] | $m_o$($Mg^{2+}$)/$m_o$($Li^+$)[h] | $m_w$($Mg^{2+}$)/$m_w$($Li^+$)[i] |
|---|---|---|---|---|---|---|---|---|---|
| Extraction | 20 | 3:1 | 65.82 | 4.39 | 0.64 | 0.015 | 41.94 | 3.78 | 158.52 |
| | T/° C.[j] | A/O[k] | S($Li^+$)/%[l] | S($Mg^{2+}$)/%[m] | $D_s$($Li^+$)[n] | $D_s$($Mg^{2+}$)[o] | $β_s$($Li^+$/$Mg^{2+}$)[p] | $m_{so}$($Mg^{2+}$)/$m_{so}$($Li^+$)[q] | $m_{sw}$($Mg^{2+}$)/$m_{sw}$($Li^+$)[r] |
| Stripping | 20 | 1:3 | 87.59 | 70.91 | 21.17 | 7.31 | 2.90 | 8.86 | 3.06 |

*Wherein, the symbolic meanings are respectively specified as below:
[a]extraction temperature,
[b]volume ratio of the organic phase to the water phase,
[c]extraction rate of $Li^+$,
[d]extraction rate of $Mg^{2+}$,
[e]distribution ratio of $Li^{2+}$,
[f]distribution ratio of $Mg^{2+}$,
[g]separation coefficient of lithium and magnesium,
[h]mass ratio of magnesium to lithium in the post-extraction organic phase,
[i]mass ratio of magnesium to lithium in the post-extraction brine;
[j]stripping temperature,
[k]volume ratio of the water phase to the organic phase,
[l]stripping ratio of $Li^+$,
[m]stripping ratio of $Mg^{2+}$,
[n]stripping distribution ratio of $Li^+$,
[o]stripping distribution ratio of $Mg^+$,
[p]stripping separation coefficient of lithium and magnesium,
[q]mass ratio of magnesium to lithium in the post-stripping organic phase,
[r]mass ratio of magnesium to lithium in the post-stripping water phase;
the symbolic meanings in tables 2 to 39 below are also the same as the above.

As can be seen from Table 1, the single-stage extraction rate of $Li^+$ was 65.82%, the single-stage extraction rate of $Mg^{2+}$ was 4.39%, the separation coefficient of lithium and magnesium was 41.94. The single-stage stripping rate of $Li^+$ was 87.59%, the single-stage stripping rate of $Mg^{2+}$ was 70.91%, the separation coefficient of lithium and magnesium after stripping was 2.90, the concentration of $Li^+$ in the stripping water phase was 1.15 g/L, and the mass ratio of magnesium to lithium was reduced to 3.06.

Embodiment 2

30 mL N-sec-heptyl heptamide was added into a 100 mL ground conical flask as an extractant, into which was then added 10 mL salt lake brine of Embodiment 1, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:6 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 2.

TABLE 2

Two-phase separation profile of $Li^+$ and $Mg^{2+}$ in the brine of a salt lake in Qinghai province by a solvent of N-sec-heptyl heptamide

| | T/° C. | O/A | E($Li^+$)/% | E($Mg^{2+}$)/% | D($Li^+$) | D($Mg^{2+}$) | β($Li^+$/$Mg^{2+}$) | $m_o$($Mg^{2+}$)/$m_o$($Li^+$)[h] | $m_w$($Mg^{2+}$)/$m_w$($Li^+$) |
|---|---|---|---|---|---|---|---|---|---|
| Extraction | 20 | 3:1 | 58.96 | 6.23 | 0.48 | 0.022 | 21.61 | 5.99 | 129.48 |
| | T/° C. | A/O | S($Li^+$)/% | S($Mg^{2+}$)/% | $D_s$($Li^+$) | $D_s$($Mg^{2+}$) | $β_s$($Li^+$/$Mg^{2+}$) | $m_{so}$($Mg^{2+}$)/$m_{so}$($Li^+$) | $m_{sw}$($Mg^{2+}$)/$m_{sw}$($Li^+$) |
| Stripping | 20 | 1:6 | 89.04 | 33.88 | 48.38 | 3.05 | 15.85 | 36.12 | 2.28 |

As can be seen from Table 2, the single-stage extraction rate of $Li^+$ was 58.96%, the single-stage extraction rate of $Mg^{2+}$ was 6.23%, the separation coefficient of lithium and magnesium was 21.61. The single-stage stripping rate of $Li^+$ was 89.04%, the single-stage stripping rate of $Mg^{2+}$ was 33.88%, the separation coefficient of lithium and magnesium after stripping was 15.85, the concentration of $Li^+$ in the stripping water phase was 2.10 g/L, and the mass ratio of magnesium to lithium was reduced to 2.28.

Embodiment 3

30 mL N-isooctyl heptamide was added into a 100 mL ground conical flask as an extractant, into which was then added 10 mL salt lake brine of Embodiment 1, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 3.

As can be seen from Table 3, the single-stage extraction rate of $Li^+$ was 44.51%, the single-stage extraction rate of $Mg^{2+}$ was 3.95%, the separation coefficient of lithium and magnesium was 19.46. The single-stage stripping rate of $Li^+$ was 85.83%, the single-stage stripping rate of $Mg^{2+}$ was 31.68%, the separation coefficient of lithium and magnesium after stripping was 13.06, the concentration of $Li^+$ in the stripping water phase was 0.76 g/L, and the mass ratio of magnesium to lithium was reduced to 1.86.

Embodiment 4

30 mL N-isooctyl caprylamide was added into a 100 mL ground conical flask as an extractant, into which was then added 10 mL salt lake brine of Embodiment 1, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 4.

TABLE 3

Two-phase separation profile of $Li^+$ and $Mg^{2+}$ in the brine of a salt lake in Qinghai province by a solvent of N-isooctyl heptamide

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 44.51 | 3.95 | 0.27 | 0.014 | 19.46 | 5.03 | 98.09 |
| | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:3 | 85.83 | 31.68 | 18.96 | 1.45 | 13.06 | 24.25 | 1.86 |

TABLE 4

Two-phase separation profile of $Li^+$ and $Mg^{2+}$ in the brine of a salt lake in Qinghai province by a solvent of N-isooctyl caprylamide

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 50.39 | 5.47 | 0.34 | 0.019 | 17.54 | 6.15 | 107.98 |
| Stripping | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:3 | 88.81 | 50.80 | 23.81 | 3.10 | 7.69 | 27.05 | 3.52 |

As can be seen from Table 4, the single-stage extraction rate of $Li^+$ was 50.39%, the single-stage extraction rate of $Mg^{2+}$ was 5.47%, the separation coefficient of lithium and magnesium was 17.54. The single-stage stripping rate of $Li^+$ was 88.81%, the single-stage stripping rate of $Mg^{2+}$ was 50.80%, the separation coefficient of lithium and magnesium after stripping was 7.69, the concentration of $Li^+$ in the stripping water phase was 0.90 g/L, and the mass ratio of magnesium to lithium was reduced to 3.52.

Embodiment 5

30 mL N-isooctyl capramide was added into a 100 mL ground conical flask as an extractant, into which was then added 10 mL salt lake brine of Embodiment 1, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 5.

As can be seen from Table 5, the single-stage extraction rate of $Li^+$ was 35.37%, the single-stage extraction rate of $Mg^{2+}$ was 2.11%, the separation coefficient of lithium and magnesium was 25.41. The single-stage stripping rate of $Li^+$ was 91.97%, the single-stage stripping rate of $Mg^{2+}$ was 28.29%, the separation coefficient of lithium and magnesium after stripping was 29.03, the concentration of $Li^+$ in the stripping water phase was 0.65 g/L, and the mass ratio of magnesium to lithium was reduced to 1.04.

Embodiment 6

15 mL N-isobutyl isopelargonamide and 15 mL N-isopentyl caprylamide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added water at a volume ratio of 1:5 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 6.

TABLE 4

Two-phase separation profile of $Li^+$ and $Mg^{2+}$ in the brine of a salt lake in Qinghai province by a solvent of N-isooctyl capramide

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 35.37 | 2.11 | 0.18 | 0.0072 | 25.41 | 3.38 | 85.83 |
| Stripping | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:3 | 91.97 | 28.29 | 34.36 | 1.18 | 29.03 | 30.19 | 1.04 |

TABLE 6

Two-phase separation profile of $Li^+$ and $Mg^{2+}$ in the brine of a salt lake in Qinghai
province by a mixed solvent of N-isobutyl isopelargonamide and N-isopentyl caprylamide

| Extraction | T/° C. | O/A | E($Li^+$)/% | E($Mg^{2+}$)/% | D($Li^+$) | D($Mg^{2+}$) | β($Li^+$/$Mg^{2+}$) | $m_o(Mg^{2+})/m_o(Li^+)$ | $m_w(Mg^{2+})/m_w(Li^+)$ |
|---|---|---|---|---|---|---|---|---|---|
| | 20 | 3:1 | 69.07 | 5.23 | 0.74 | 0.018 | 40.48 | 4.29 | 173.61 |
| Stripping | T/° C. | A/O | S($Li^+$)/% | S($Mg^{2+}$)/% | $D_s(Li^+)$ | $D_s(Mg^{2+})$ | $β_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:5 | 83.06 | 55.69 | 24.42 | 6.27 | 3.90 | 11.20 | 2.88 |

As can be seen from Table 6, the single-stage extraction rate of $Li^+$ was 69.07%, the single-stage extraction rate of $Mg^{2+}$ was 5.23%, the separation coefficient of lithium and magnesium was 40.48. The single-stage stripping rate of $Li^+$ was 83.06%, the single-stage stripping rate of $Mg^{2+}$ was 55.69%, the separation coefficient of lithium and magnesium after stripping was 3.90, the concentration of $Li^+$ in the stripping water phase was 1.91 g/L, and the mass ratio of magnesium to lithium was reduced to 2.88.

Embodiment 7

15 mL N-isobutyl isopelargonamide and 15 mL N-isooctyl valeramide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 10° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 10° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 7.

As can be seen from Table 7, the single-stage extraction rate of $Li^+$ was 66.49%, the single-stage extraction rate of $Mg^{2+}$ was 1.42%, the separation coefficient of lithium and magnesium was 137.71. The single-stage stripping rate of $Li^+$ was 77.89%, the single-stage stripping rate of $Mg^{2+}$ was 70.82%, the separation coefficient of lithium and magnesium after stripping was 1.45, the concentration of $Li^+$ in the stripping water phase was 1.73 g/L, and the mass ratio of magnesium to lithium was reduced to 1.10.

Embodiment 8

15 mL N-isopentyl caprylamide and 15 mL N-isopentyl isocaprylamide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 10° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 10° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 8.

TABLE 7

Two-phase separation profile of $Li^+$ and $Mg^{2+}$ in the brine of a salt lake in Qinghai
province by a mixed solvent of N-isobutyl isopelargonamide and N-isooctyl valeramide

| Extraction | T/° C. | O/A | E($Li^+$)/% | E($Mg^{2+}$)/% | D($Li^+$) | D($Mg^{2+}$) | β($Li^+/Mg^{2+}$) | $m_o(Mg^{2+})/m_o(Li^+)$ | $m_w(Mg^{2+})/m_w(Li^+)$ |
|---|---|---|---|---|---|---|---|---|---|
| | 10 | 3:1 | 66.49 | 1.42 | 0.66 | 0.0048 | 137.71 | 1.21 | 166.21 |
| Stripping | T/° C. | A/O | S($Li^+$)/% | S($Mg^{2+}$)/% | $D_s(Li^+)$ | $D_s(Mg^{2+})$ | $β_s(Li^+/Mg^{2+})$ | $m_{so}(Mg^{2+})/m_{so}(Li^+)$ | $m_{sw}(Mg^{2+})/m_{sw}(Li^+)$ |
| | 10 | 1:5 | 77.89 | 70.82 | 18.06 | 12.44 | 1.45 | 1.59 | 1.10 |

TABLE 8

Two-phase separation profile of $Li^+$ and $Mg^{2+}$ in the brine of a salt lake in Qinghai province by a mixed solvent of N-isopentyl caprylamide and N-isopentyl isocaprylamide

| Extraction | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)^h$ | $m_w(Mg^{2+})/m_w(Li^+)$ |
|---|---|---|---|---|---|---|---|---|---|
|  | 10 | 3:1 | 59.09 | 7.49 | 0.48 | 0.027 | 17.83 | 7.18 | 128.09 |
| Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
|  | 10 | 1:5 | 93.37 | 65.05 | 70.34 | 9.27 | 7.59 | 37.79 | 4.98 |

As can be seen from Table 8, the single-stage extraction rate of $Li^+$ was 59.09%, the single-stage extraction rate of $Mg^{2+}$ was 7.49%, the separation coefficient of lithium and magnesium was 17.83. The single-stage stripping rate of $Li^+$ was 93.37%, the single-stage stripping rate of $Mg^{2+}$ was 65.05%, the separation coefficient of lithium and magnesium after stripping was 7.59, the concentration of $Li^+$ in the stripping water phase was 1.84 g/L, and the mass ratio of magnesium to lithium was reduced to 4.98.

Embodiment 9

In brine from a salt lake in the Chaidamu basin of Qinghai province, the contents of $Li^+$ and $Mg^{2+}$ were 0.33 g/L and 102.50 g/L respectively, the mass ratio of magnesium to lithium was 314.23:1, wherein the contents of $Na^+$, $K^+$, $Cl^-$, $SO_4^{2-}$ and $B_2O_3$ were 5.16, 3.32, 311.40, 11.13 and 1.14 g/L respectively, the density of brine was 1.31 g/cm³, and the pH value of the brine was 5.5. 10 mL of this brine was added into a 100 mL ground conical flask, into which was then added 15 mL N-isopentyl caprylamide and 15 mL N-isooctyl valeramide as the extractants, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:6 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 9.

TABLE 9

Two-phase separation profile of $Li^+$ and $Mg^{2+}$ in the brine of a salt lake in Qinghai province by a mixed solvent of N-isopentyl caprylamide and N-isooctyl valeramide

| Extraction | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)^h$ | $m_w(Mg^{2+})/m_w(Li^+)$ |
|---|---|---|---|---|---|---|---|---|---|
|  | 20 | 3:1 | 69.47 | 3.05 | 0.76 | 0.011 | 72.37 | 13.80 | 998.20 |
| Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
|  | 20 | 1:6 | 91.77 | 72.58 | 66.00 | 15.67 | 4.21 | 45.96 | 10.91 |

As can be seen from Table 9, the single-stage extraction rate of $Li^+$ was 69.47%, the single-stage extraction rate of $Mg^{2+}$ was 3.05%, the separation coefficient of lithium and magnesium was 72.37. The single-stage stripping rate of $Li^+$ was 91.77%, the single-stage stripping rate of $Mg^{2+}$ was 72.58%, the separation coefficient of lithium and magnesium after stripping was 4.21, the concentration of $Li^+$ in the stripping water phase was 0.42 g/L, and the mass ratio of magnesium to lithium was reduced to 10.91.

Embodiment 10

In brine from a salt lake in the Chaidamu basin of Qinghai province, the contents of $Li^+$ and $Mg^{2+}$ were 5.72 g/L and 116.36 g/L respectively, the mass ratio of magnesium to lithium was 20.35:1, wherein the contents of $Na^+$, $K^+$, $Cl^-$, $SO_4^{2-}$ and $B_2O_3$ were 2.70, 1.04, 346.21, 37.32 and 16.89 g/L respectively, the density of brine was 1.36 g/cm³, and the pH value of the brine was 4.1. 10 mL of this brine was added into a 100 mL ground conical flask, into which was then added 15 mL N-isopentyl caprylamide and 15 mL N-isooctyl valeramide as the extractants, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:6 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 10.

TABLE 10

Two-phase separation profile of $Li^+$ and $Mg^{2+}$ in the brine of a salt lake in Qinghai province by a mixed solvent of N-isopentyl caprylamide and N-isooctyl valeramide

| Extraction | T/°C | O/A | E($Li^+$)/% | E($Mg^{2+}$)/% | D($Li^+$) | D($Mg^{2+}$) | β($Li^+/Mg^{2+}$) | $m_o(Mg^{2+})/m_o(Li^+)$ | $m_w(Mg^{2+})/m_w(Li^+)$ |
|---|---|---|---|---|---|---|---|---|---|
|  | 20 | 3:1 | 66.05 | 0.88 | 0.65 | 0.0030 | 218.60 | 0.27 | 59.60 |
| Stripping | T/°C | A/O | S($Li^+$)/% | S($Mg^{2+}$)/% | $D_s(Li^+)$ | $D_s(Mg^{2+})$ | $β_s(Li^+/Mg^{2+})$ | $m_{so}(Mg^{2+})/m_{so}(Li^+)$ | $m_{sw}(Mg^{2+})/m_{sw}(Li^+)$ |
|  | 20 | 1:6 | 59.82 | 66.01 | 9.08 | 11.84 | 0.77 | 0.23 | 0.30 |

As can be seen from Table 10, the single-stage extraction rate of $Li^+$ was 66.05%, the single-stage extraction rate of $Mg^{2+}$ was 0.88%, the separation coefficient of lithium and magnesium was 218.60. The single-stage stripping rate of $Li^+$ was 59.82%, the single-stage stripping rate of $Mg^{2+}$ was 66.01%, the separation coefficient of lithium and magnesium after stripping was 0.77, the concentration of $Li^+$ in the stripping water phase was 4.52 g/L, and the mass ratio of magnesium to lithium was reduced to 0.30.

Embodiment 11

21 mL N-isooctyl valeramide and 9 mL N-cyclopropyl capramide (liquid after heating) were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 11.

TABLE 11

Two-phase separation profile of $Li^+$ and $Mg^{2+}$ in the brine of a salt lake in Qinghai province by a mixed solvent of N-isooctyl valeramide and N-cyclopropyl capramide

| Extraction | T/° C. | O/A | $E(Li^+)$/% | $E(Mg^{2+})$/% | $D(Li^+)$ | $D(Mg^{2+})$ | $β(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| | 20 | 3:1 | 53.32 | 5.22 | 0.38 | 0.018 | 20.75 | 5.55 | 115.06 |
| Stripping | T/° C. | A/O | $S(Li^+)$/% | $S(Mg^{2+})$/% | $D_s(Li^+)$ | $D_s(Mg^{2+})$ | $β_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:3 | 92.87 | 50.72 | 40.19 | 3.17 | 12.66 | 38.35 | 3.03 |

As can be seen from Table 11, the single-stage extraction rate of $Li^+$ was 53.32%, the single-stage extraction rate of $Mg^{2+}$ was 5.22%, the separation coefficient of lithium and magnesium was 20.75. The single-stage stripping rate of $Li^+$ was 92.87%, the single-stage stripping rate of $Mg^{2+}$ was 50.72%, the separation coefficient of lithium and magnesium after stripping was 12.66, the concentration of $Li^+$ in the stripping water phase was 0.99 g/L, and the mass ratio of magnesium to lithium was reduced to 3.03.

Embodiment 12

15 mL N-isooctyl valeramide and 15 mL N-cyclopentyl isocaprylamide (liquid after heating) were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 12.

As can be seen from Table 12, the single-stage extraction rate of $Li^+$ was 49.89%, the single-stage extraction rate of $Mg^{2+}$ was 3.17%, the separation coefficient of lithium and magnesium was 29.99. The single-stage stripping rate of $Li^+$ was 86.92%, the single-stage stripping rate of $Mg^{2+}$ was 28.21%, the separation coefficient of lithium and magnesium after stripping was 16.91, the concentration of $Li^+$ in the stripping water phase was 0.87 g/L, and the mass ratio of magnesium to lithium was reduced to 1.17.

Embodiment 13

21 mL N-isooctyl valeramide and 9 mL N-cyclohexyl heptamide (liquid after heating) were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 30° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 30° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 13.

TABLE 12

Two-phase separation profile of $Li^+$ and $Mg^{2+}$ in the brine of a salt lake in Qinghai province by a mixed solvent of N-isooctyl valeramide and N-cyclopentyl isocaprylamide

| Extraction | T/° C. | O/A | $E(Li^+)$/% | $E(Mg^{2+})$/% | $D(Li^+)$ | $D(Mg^{2+})$ | $β(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| | 20 | 3:1 | 49.89 | 3.17 | 0.33 | 0.011 | 29.99 | 3.60 | 109.51 |
| Stripping | T/° C. | A/O | $S(Li^+)$/% | $S(Mg^{2+})$/% | $D_s(Li^+)$ | $D_s(Mg^{2+})$ | $β_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:3 | 86.92 | 28.21 | 21.39 | 1.27 | 16.91 | 19.76 | 1.17 |

TABLE 13

Two-phase separation profile of $Li^+$ and $Mg^{2+}$ in the brine of a salt lake in Qinghai province by a mixed solvent of N-isooctyl valeramide and N-cyclohexyl heptamide

| | T/° C. | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) |
|---|---|---|---|---|---|---|---|---|---|
| Extraction | 30 | 3:1 | 50.41 | 2.81 | 0.34 | 0.0096 | 35.17 | 3.16 | 111.07 |
| | T/° C. | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) |
| Stripping | 30 | 1:4 | 91.94 | 30.31 | 47.00 | 1.79 | 26.21 | 27.31 | 1.04 |

As can be seen from Table 13, the single-stage extraction rate of Li$^+$ was 50.41%, the single-stage extraction rate of Mg$^{2+}$ was 2.81%, the separation coefficient of lithium and magnesium was 35.17. The single-stage stripping rate of Li$^+$ was 91.94%, the single-stage stripping rate of Mg$^{2+}$ was 30.31%, the separation coefficient of lithium and magnesium after stripping was 26.21, the concentration of Li$^+$ in the stripping water phase was 1.24 g/L, and the mass ratio of magnesium to lithium was reduced to 1.04.

Embodiment 14

15 mL N-pentyl isopelargonamide and 15 mL N-isooctyl isocaproamide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min.

When the interface was clear, the two phases were separated to get a post-extraction loaded organic phase and a remaining brine phase. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of Li$^+$ and Mg$^{2+}$, thus calculating the experimental results as shown in Table 14.

As can be seen from Table 14, the single-stage extraction rate of Li$^+$ was 55.63%, the single-stage extraction rate of Mg$^{2+}$ was 1.15%, the separation coefficient of lithium and magnesium was 107.71. The single-stage stripping rate of Li$^+$ was 69.90%, the single-stage stripping rate of Mg$^{2+}$ was 54.99%, the separation coefficient of lithium and magnesium after stripping was 1.90, the concentration of Li$^+$ in the stripping water phase was 1.30 g/L, and the mass ratio of magnesium to lithium was reduced to 0.92.

Embodiment 15

15 mL N-pentyl isopelargonamide and 15 mL N-cyclopentyl pelargonamide (liquid after heating) were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of Li$^+$ and Mg$^{2+}$, thus calculating the experimental results as shown in Table 15.

TABLE 14

Two-phase separation profile of $Li^+$ and $Mg^{2+}$ in the brine of a salt lake in Qinghai province by a mixed solvent of N-pentyl isopelargonamide and N-isooctyl isocaproamide

| | T/° C. | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) |
|---|---|---|---|---|---|---|---|---|---|
| Extraction | 20 | 3:1 | 55.63 | 1.15 | 0.42 | 0.0039 | 107.71 | 1.17 | 126.24 |
| | T/° C. | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) |
| Stripping | 20 | 1:5 | 69.90 | 54.99 | 11.92 | 6.27 | 1.90 | 1.75 | 0.92 |

TABLE 15

Two-phase separation profile of $Li^+$ and $Mg^{2+}$ in the brine of a salt lake in Qinghai
province by a mixed solvent of N-pentyl isopelargonamide and N-cyclopentyl pelargonamide

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 51.22 | 4.50 | 0.35 | 0.016 | 22.27 | 4.98 | 110.95 |
| | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:3 | 93.62 | 65.34 | 45.65 | 5.86 | 7.79 | 27.05 | 3.47 |

As can be seen from Table 15, the single-stage extraction rate of $Li^+$ was 51.22%, the single-stage extraction rate of $Mg^{2+}$ was 4.50%, the separation coefficient of lithium and magnesium was 22.27. The single-stage stripping rate of $Li^+$ was 93.62%, the single-stage stripping rate of $Mg^{2+}$ was 65.34%, the separation coefficient of lithium and magnesium after stripping was 7.79, the concentration of $Li^+$ in the stripping water phase was 0.96 g/L, and the mass ratio of magnesium to lithium was reduced to 3.47.

Embodiment 16

22.5 mL N-isooctyl capramide and 7.5 mL N-dodecyl isocaproamide (liquid after heating) were added into a 100 mL ground conical flask as the extractants, into which was then added 10 mL salt lake brine of Embodiment 10, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 16.

As can be seen from Table 16, the single-stage extraction rate of $Li^+$ was 40.16%, the single-stage extraction rate of $Mg^{2+}$ was 2.00%, the separation coefficient of lithium and magnesium was 32.89. The single-stage stripping rate of $Li^+$ was 66.28%, the single-stage stripping rate of $Mg^{2+}$ was 52.20%, the separation coefficient of lithium and magnesium after stripping was 1.80, the concentration of $Li^+$ in the stripping water phase was 2.03 g/L, and the mass ratio of magnesium to lithium was reduced to 0.80.

Embodiment 17

10 mL N-butyl pelargonamide, 10 mL N-pentyl caprylamide and 10 mL N-isopentyl isocaprylamide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 0° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 0° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 17.

TABLE 16

Two-phase separation profile of $Li^+$ and $Mg^{2+}$ in the brine of a salt lake in Qinghai
province by a mixed solvent of N-isooctyl capramide and N-dodecyl isocaproamide

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 40.16 | 2.00 | 0.22 | 0.0068 | 32.89 | 1.01 | 33.33 |
| | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:4 | 66.28 | 52.20 | 8.62 | 4.79 | 1.80 | 1.40 | 0.80 |

TABLE 17

Two-phase separation profile of $Li^+$ and $Mg^{2+}$ in the brine of a salt lake in Qinghai province by a mixed solvent of N-butyl pelargonamide, N-pentyl caprylamide and N-isopentyl isocaprylamide

| Extraction | T/° C. | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) |
|---|---|---|---|---|---|---|---|---|---|
| | 0 | 3:1 | 67.31 | 1.98 | 0.68 | 0.0067 | 101.66 | 1.67 | 169.94 |
| Stripping | T/° C. | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) |
| | 0 | 1:4 | 78.78 | 81.94 | 15.69 | 19.18 | 0.82 | 1.42 | 1.74 |

As can be seen from Table 17, the single-stage extraction rate of $Li^+$ was 67.31%, the single-stage extraction rate of $Mg^{2+}$ was 1.98%, the separation coefficient of lithium and magnesium was 101.66. The single-stage stripping rate of $Li^+$ was 78.78%, the single-stage stripping rate of $Mg^{2+}$ was 81.94%, the separation coefficient of lithium and magnesium after stripping was 0.82, the concentration of $Li^+$ in the stripping water phase was 1.41 g/L, and the mass ratio of magnesium to lithium was reduced to 1.74.

Embodiment 18

10 mL N-isobutyl isopelargonamide, 10 mL N-isopentyl caprylamide and 10 mL N-isooctyl valeramide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 0° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 0° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 18.

As can be seen from Table 18, the single-stage extraction rate of $Li^+$ was 70.54%, the single-stage extraction rate of $Mg^{2+}$ was 5.94%, the separation coefficient of lithium and magnesium was 37.93. The single-stage stripping rate of $Li^+$ was 90.37%, the single-stage stripping rate of $Mg^{2+}$ was 85.02%, the separation coefficient of lithium and magnesium after stripping was 1.65, the concentration of $Li^+$ in the stripping water phase was 1.28 g/L, and the mass ratio of magnesium to lithium was reduced to 4.49.

Embodiment 19

10 mL N-pentyl caprylamide, 10 mL N-octyl valeramide and 10 mL N-isooctyl valeramide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:6 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 19.

TABLE 18

Two-phase separation profile of $Li^+$ and $Mg^{2+}$ in the brine of a salt lake in Qinghai province by a mixed solvent of N-isobutyl isopelargonamide, N-isopentyl caprylamide and N-isooctyl valeramide

| Extraction | T/° C. | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) |
|---|---|---|---|---|---|---|---|---|---|
| | 0 | 3:1 | 7.54 | 5.94 | 0.80 | 0.021 | 37.93 | 4.77 | 180.96 |
| Stripping | T/° C. | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) |
| | 0 | 1:3 | 90.37 | 85.02 | 28.10 | 17.00 | 1.65 | 7.42 | 4.49 |

TABLE 19

Two-phase separation profile of Li⁺ and Mg²⁺ in the brine of a salt lake in Qinghai province by a mixed solvent of N-pentyl caprylamide, N-octyl valeramide and N-isooctyl valeramide

| | T/° C. | O/A | E(Li⁺)/% | E(Mg²⁺)/% | D(Li⁺) | D(Mg²⁺) | β(Li⁺/Mg²⁺) | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 70.04 | 2.35 | 0.78 | 0.0080 | 97.30 | 1.90 | 184.71 |
| | T/° C. | A/O | S(Li⁺)/% | S(Mg²⁺)/% | $D_s(Li^+)$ | $D_s(Mg^{2+})$ | $β_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:6 | 57.62 | 51.56 | 8.25 | 6.46 | 1.28 | 2.17 | 1.70 |

As can be seen from Table 19, the single-stage extraction rate of Li⁺ was 70.04%, the single-stage extraction rate of Mg²⁺ was 2.35%, the separation coefficient of lithium and magnesium was 97.30. The single-stage stripping rate of Li⁺ was 57.62%, the single-stage stripping rate of Mg²⁺ was 51.56%, the separation coefficient of lithium and magnesium after stripping was 1.28, the concentration of Li⁺ in the stripping water phase was 1.62 g/L, and the mass ratio of magnesium to lithium was reduced to 1.70.

Embodiment 20

10 mL N-pentyl caprylamide, 10 mL N-octyl valeramide and 10 mL N-isooctyl isovaleramide were added into a 100 mL ground conical flask as the extractants, into which was then added 3 mL salt lake brine of Embodiment 1, wherein the volume ratio of the extractants to the salt lake brine was 10:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of Li⁺ and Mg²⁺, thus calculating the experimental results as shown in Table 20.

As can be seen from Table 20, the single-stage extraction rate of Li⁺ was 88.79%, the single-stage extraction rate of Mg²⁺ was 16.59%, the separation coefficient of lithium and magnesium was 39.87. The single-stage stripping rate of Li⁺ was 87.71%, the single-stage stripping rate of Mg²⁺ was 70.18%, the separation coefficient of lithium and magnesium after stripping was 3.03, the concentration of Li⁺ in the stripping water phase was 0.62 g/L, and the mass ratio of magnesium to lithium was reduced to 8.47.

Embodiment 21

7.5 mL N-pentyl caprylamide, 7.5 mL N-isopentyl caprylamide, 7.5 mL N-octyl valeramide (liquid after heating) and 7.5 mL N-isooctyl valeramide were added into a 100 mL ground conical flask as the extractants, into which was then added 10 mL salt lake brine of Embodiment 1, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, which was centrifuged in a LD5-10 benchtop centrifuge at a rotational speed of 4000 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, which was centrifuged in a LD5-10 benchtop centrifuge at a rotational speed of 4000 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of Li⁺ and Mg²⁺, thus calculating the experimental results as shown in Table 21.

TABLE 20

Two-phase separation profile of Li⁺ and Mg²⁺ in the brine of a salt lake in Qinghai province by a mixed solvent of N-pentyl caprylamide, N-octyl valeramide and N-isooctyl isovaleramide

| | T/° C. | O/A | E(Li⁺)/% | E(Mg²⁺)/% | D(Li⁺) | D(Mg²⁺) | β(Li⁺/Mg²⁺) | $m_o(Mg^{2+})/m_o(Li^+)$ | $m_w(Mg^{2+})/m_w(Li^+)$ |
|---|---|---|---|---|---|---|---|---|---|
| Extraction | 20 | 10:1 | 88.79 | 16.59 | 0.79 | 0.020 | 39.87 | 10.59 | 421.66 |
| | T/° C. | A/O | S(Li⁺)/% | S(Mg²⁺)/% | $D_s(Li^+)$ | $D_s(Mg^{2+})$ | $β_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:4 | 87.71 | 70.18 | 28.48 | 9.39 | 3.03 | 25.69 | 8.47 |

TABLE 21

Two-phase separation profile of $Li^+$ and $Mg^{2+}$ in the brine of a salt lake in Qinghai province by a mixed solvent of N-pentyl caprylamide, N-isopentyl caprylamide, N-octyl valeramide and N-isooctyl valeramide

| | T/° C. | O/A | E(Li$^+$)/% | E(Mg$^{2+}$)/% | D(Li$^+$) | D(Mg$^{2+}$) | β(Li$^+$/Mg$^{2+}$) | $m_o$(Mg$^{2+}$)/$m_o$(Li$^+$) | $m_w$(Mg$^{2+}$)/$m_w$(Li$^+$) |
|---|---|---|---|---|---|---|---|---|---|
| Extraction | 20 | 3:1 | 70.50 | 2.53 | 0.80 | 0.0086 | 92.03 | 2.03 | 187.25 |
| Stripping | T/° C. | A/O | S(Li$^+$)/% | S(Mg$^{2+}$)/% | $D_s$(Li$^+$) | $D_s$(Mg$^{2+}$) | $β_s$(Li$^+$/Mg$^{2+}$) | $m_{so}$(Mg$^{2+}$)/$m_{so}$(Li$^+$) | $m_{sw}$(Mg$^{2+}$)/$m_{sw}$(Li$^+$) |
| | 20 | 1:4 | 77.07 | 65.50 | 12.85 | 7.26 | 1.77 | 3.02 | 1.73 |

As can be seen from Table 21, the single-stage extraction rate of Li$^+$ was 70.50%, the single-stage extraction rate of Mg$^{2+}$ was 2.53%, the separation coefficient of lithium and magnesium was 92.03. The single-stage stripping rate of Li$^+$ was 77.07%, the single-stage stripping rate of Mg$^{2+}$ was 65.50%, the separation coefficient of lithium and magnesium after stripping was 1.77, the concentration of Li$^+$ in the stripping water phase was 1.45 g/L, and the mass ratio of magnesium to lithium was reduced to 1.73.

Embodiment 22

10 mL salt lake brine of Embodiment 1 was added into a 100 mL ground conical flask, into which was then added 0.81 g ferric trichloride hexahydrate at a purity of 99% to dissolve before additionally adding 30 mL N-pentyl isopelargonamide as the extractant, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of Li$^+$ and Mg$^{2+}$, thus calculating the experimental results as shown in Table 22.

As can be seen from Table 22, the single-stage extraction rate of Li$^+$ was 67.97%, the single-stage extraction rate of Mg$^{2+}$ was 4.52%, the separation coefficient of lithium and magnesium was 44.79. The single-stage stripping rate of Li$^+$ was 95.48%, the single-stage stripping rate of Mg$^{2+}$ was 41.86%, the separation coefficient of lithium and magnesium after stripping was 29.33, the concentration of Li$^+$ in the stripping water phase was 1.30 g/L, and the mass ratio of magnesium to lithium was reduced to 1.65.

Embodiment 23

10 mL salt lake brine of Embodiment 1 was added into a 100 mL ground conical flask, into which was then added 0.59 g ferrous chloride tetrahydrate at a purity of 99% to dissolve before additionally adding 30 mL N-isooctyl caprylamide as the extractant, wherein the volume ratio of the extractant to the salt lake brine was 3:1. The conical flask was inserted with a polytetrafluoroethylene stirring rod, which was stirred by a DW-1-60 direct-current constant speed stirrer to mix at 20° C. and extract for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was inserted with a polytetrafluoroethylene stirring rod, which was stirred by a DW-1-60 direct-current constant speed stirrer at 20° C. for stripping and two-phase mixing for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of Li$^+$ and Mg$^{2+}$, thus calculating the experimental results as shown in Table 23.

TABLE 22

Two-phase separation profile of Li$^+$ and Mg$^{2+}$ in the brine containing Fe$^{3+}$ of a salt lake in Qinghai province by a mixed solvent of N-pentyl isopelargonamide

| | T/° C. | O/A | E(Li$^+$)/% | E(Mg$^{2+}$)/% | D(Li$^+$) | D(Mg$^{2+}$) | β(Li$^+$/Mg$^{2+}$) | $m_o$(Mg$^{2+}$)/$m_o$(Li$^+$) | $m_w$(Mg$^{2+}$)/$m_w$(Li$^+$) |
|---|---|---|---|---|---|---|---|---|---|
| Extraction | 20 | 3:1 | 67.97 | 4.52 | 0.71 | 0.016 | 44.79 | 3.76 | 168.93 |
| Stripping | T/° C. | A/O | S(Li$^+$)/% | S(Mg$^{2+}$)/% | $D_s$(Li$^+$) | $D_s$(Mg$^{2+}$) | $β_s$(Li$^+$/Mg$^{2+}$) | $m_{so}$(Mg$^{2+}$)/$m_{so}$(Li$^+$) | $m_{sw}$(Mg$^{2+}$)/$m_{sw}$(Li$^+$) |
| | 20 | 1:3 | 95.48 | 41.86 | 63.24 | 2.16 | 29.33 | 48.47 | 1.65 |

TABLE 23

Two-phase separation profile of $Li^+$ and $Mg^{2+}$ in the brine containing $Fe^{3+}$ of a salt lake in Qinghai province by a mixed solvent of N-isooctyl caprylamide

| Extraction | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| | 20 | 3:1 | 56.86 | 10.80 | 0.44 | 0.040 | 10.89 | 10.76 | 117.18 |
| Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:3 | 90.96 | 98.64 | 30.16 | 217.33 | 0.14 | 1.62 | 11.67 |

As can be seen from Table 23, the single-stage extraction rate of $Li^+$ was 56.86%, the single-stage extraction rate of $Mg^{2+}$ was 10.80%, the separation coefficient of lithium and magnesium was 10.89. The single-stage stripping rate of $Li^+$ was 90.96%, the single-stage stripping rate of $Mg^{2+}$ was 98.64%, the separation coefficient of lithium and magnesium after stripping was 0.14, the concentration of $Li^+$ in the stripping water phase was 1.03 g/L, and the mass ratio of magnesium to lithium was reduced to 11.67.

Embodiment 24

27 mL N-isooctyl valeramide and 3 mL N-dodecyl acetamide (liquid after heating) were added into a 100 mL ground conical flask as the extractants, into which was then added 3 mL magnesium-containing brine, wherein the volume ratio of the organic phase to the brine was 10:1. In the magnesium-containing brine, the contents of $Li^+$, $Mg^{2+}$ and $Cl^-$ were 3.63, 81.40 and 255.97 g/L respectively, the mass ratio of magnesium to lithium equalled to 22.45:1, the density of brine was 1.25 g/cm³, and the pH value of the brine was 5.8. The conical flask was inserted with a polytetrafluoroethylene stirring rod, which was stirred by a DW-1-60 direct-current constant speed stirrer to mix at 50° C. and extract for 30 min. The mixed liquid was then allowed to settle naturally for 60 min. After the separation of two phases, a post-extraction brine sample and an organic phase loaded with $Li^+$ and $Mg^{2+}$ were obtained. The loaded organic phase was transferred into another 100 mL ground conical flask, into which was added deionized water at a volume ratio of 1:20 to the organic phase. The ground conical flask was inserted with a polytetrafluoroethylene stirring rod, which was stirred by a DW-1-60 direct-current constant speed stirrer at 50° C. for stripping and two-phase mixing for 30 min. The mixed liquid was then allowed to settle naturally for 60 min. After the separation of two phases, a post-stripping organic phase and a water phase were obtained.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 24.

As can be seen from Table 24, the single-stage extraction rate of $Li^+$ was 61.66%, the single-stage extraction rate of $Mg^{2+}$ was 8.56%, the separation coefficient of lithium and magnesium was 17.18. The single-stage stripping rate of $Li^+$ was 71.09%, the single-stage stripping rate of $Mg^{2+}$ was 60.90%, the separation coefficient of lithium and magnesium after stripping was 1.58, the concentration of $Li^+$ in the stripping water phase was 3.18 g/L, and the mass ratio of magnesium to lithium was reduced to 2.67.

Embodiment 25

14 mL N-isooctyl valeramide, 1 mL N-isooctyl-1-cyclopropyl carboxamide and 1 mL N-hexyl-3-cyclopentyl propanamide were added into a 100 mL ground conical flask as the extractants, into which was then added 12.3 mL magnesium-containing brine, wherein the volume ratio of the organic phase to the brine was 1.3:1. In the magnesium-containing brine, the contents of $Li^+$, $Mg^{2+}$ and $Cl^-$ were 0.11, 120.62 and 352.42 g/L respectively, the mass ratio of magnesium to lithium equalled to 1096.55:1, the density of brine was 1.33 g/cm³, and the pH value of the brine was 7.0. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 100 mL plastic test tube, which was centrifuged in a LD5-10 benchtop centrifuge at a rotational speed of 4200 r/min for 12 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:1 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, which was centrifuged in a LD5-10 benchtop centrifuge at a rotational speed of 4200 r/min for 12 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 25.

TABLE 24

Two-phase separation profile of $Li^+$ and $Mg^{2+}$ in magnesium-containing brine by a mixed solvent of N-isooctyl valeramide and N-dodecyl acetamide

| Extraction | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| | 50 | 10:1 | 61.66 | 8.56 | 0.16 | 0.0093 | 17.18 | 3.12 | 53.55 |
| Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| | 50 | 1:20 | 71.09 | 60.90 | 47.72 | 30.23 | 1.58 | 4.22 | 2.67 |

TABLE 25

Two-phase separation profile of $Li^+$ and $Mg^{2+}$ in magnesium-containing brine by a mixed solvent of N-isooctyl valeramide, N-isooctyl-1-cyclopropyl carboxamide and N-hexyl-3-cyclopentyl propanamide

| | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 1.3:1 | 71.77 | 4.80 | 1.95 | 0.039 | 50.42 | 73.34 | 3697.89 |
| | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:1 | 85.10 | 49.48 | 5.57 | 0.98 | 5.69 | 248.66 | 42.64 |

As can be seen from Table 25, the single-stage extraction rate of $Li^+$ was 71.77%, the single-stage extraction rate of $Mg^{2+}$ was 4.80%, the separation coefficient of lithium and magnesium was 50.42. The single-stage stripping rate of $Li^+$ was 85.10%, the single-stage stripping rate of $Mg^{2+}$ was 49.48%, the separation coefficient of lithium and magnesium after stripping was 5.69, the concentration of $Li^+$ in the stripping water phase was 0.052 g/L, and the mass ratio of magnesium to lithium was reduced to 42.64.

Embodiment 26

14.85 mL N-isooctyl valeramide and 0.15 mL N-cyclododecyl acetamide (liquid after heating) were added into a 100 mL ground conical flask as the extractants, into which was then added 15 mL salt lake brine of Embodiment 9, wherein the volume ratio of the extractants to the salt lake brine was 1:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 100 mL plastic test tube, which was centrifuged in a LD5-10 benchtop centrifuge at a rotational speed of 4200 r/min for 12 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:1 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, which was centrifuged in a LD5-10 benchtop centrifuge at a rotational speed of 4200 r/min for 12 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 26.

As can be seen from Table 26, the single-stage extraction rate of $Li^+$ was 37.71%, the single-stage extraction rate of $Mg^{2+}$ was 4.78%, the separation coefficient of lithium and magnesium was 12.07. The single-stage stripping rate of $Li^+$ was 94.64%, the single-stage stripping rate of $Mg^{2+}$ was 54.81%, the separation coefficient of lithium and magnesium after stripping was 14.57, the concentration of $Li^+$ in the stripping water phase was 0.12 g/L, and the mass ratio of magnesium to lithium was reduced to 23.07.

Embodiment 27

18.5 mL N-isooctyl valeramide and 1.5 mL N-ethyl lauramide (liquid after heating) were added into a 100 mL ground conical flask as extractants, into which was then added 2 mL magnesium-containing brine, wherein the volume ratio of the organic phase to the brine was 10:1. In the magnesium-containing brine, the contents of $Li^+$, $Mg^{2+}$ and $Cl^-$ were 20.42, 99.83 and 399.07 g/L respectively, the mass ratio of magnesium to lithium equalled to 4.89:1, the density of brine was 1.32 g/cm$^3$, and the pH value of the brine was adjusted to 1.0 with concentrated hydrochloric acid. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 50° C. and extracted for 30 min. The mixed liquid was then transferred into a 100 mL plastic test tube, which was centrifuged in a LD5-10 benchtop centrifuge at a rotational speed of 4200 r/min for 8 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 50° C. for 30 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 27.

TABLE 26

Two-phase separation profile of $Li^+$ and $Mg^{2+}$ in the brine of a salt lake in Qinghai province by a mixed solvent of N-isooctyl valeramide and N-cyclododecyl acetamide

| | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 1:1 | 37.71 | 4.78 | 0.61 | 0.050 | 12.07 | 39.83 | 480.35 |
| | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:1 | 94.64 | 54.81 | 17.63 | 1.21 | 14.57 | 335.81 | 23.07 |

TABLE 27

Two-phase separation profile of $Li^+$ and $Mg^{2+}$ in magnesium-containing brine by a mixed solvent of N-isooctyl valeramide and N-ethyl lauramide

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 50 | 10:1 | 52.55 | 1.60 | 0.11 | 0.0016 | 68.22 | 0.15 | 10.14 |
| | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 50 | 1:10 | 79.21 | 79.73 | 36.85 | 38.11 | 0.97 | 0.14 | 0.15 |

As can be seen from Table 27, the single-stage extraction rate of $Li^+$ was 52.55%, the single-stage extraction rate of $Mg^{2+}$ was 1.60%, the separation coefficient of lithium and magnesium was 68.22. The single-stage stripping rate of $Li^+$ was 79.21%, the single-stage stripping rate of $Mg^{2+}$ was 79.73%, the separation coefficient of lithium and magnesium after stripping was 0.97, the concentration of $Li^+$ in the stripping water phase was 8.50 g/L, and the mass ratio of magnesium to lithium was reduced to 0.15.

Embodiment 28

29.7 mL N-isooctyl valeramide, 0.15 mL N-ethyl-1-(4-pentyl cyclohexyl) carboxamide and 0.15 mL N-(4-t-butyl cyclohexyl) caprylamide were added into a 100 mL ground conical flask as the extractants, into which was then added 5 mL magnesium-containing brine, wherein the volume ratio of the organic phase to the brine was 6:1. In the magnesium-containing brine, the contents of $Li^+$, $Mg^{2+}$, $Cl^-$ and $SO_4^{2-}$ were 1.21, 80.86, 202.53 and 53.56 g/L respectively, the mass ratio of magnesium to lithium equalled to 66.83:1, the density of brine was 1.25 g/cm³, and the pH value of the brine was 7.0. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 30° C. and extracted for 30 min. The mixed liquid was then transferred into a 100 mL plastic test tube, which was centrifuged in a LD5-10 benchtop centrifuge at a rotational speed of 4200 r/min for 8 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:6 to the organic phase. The ground conical flask was placed in a DF-101S heat collecting type thermostat magnetic stirrer for stripping and two-phase mixing at 30° C. for 30 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 28.

TABLE 28

Two-phase separation profile of $Li^+$ and $Mg^{2+}$ in magnesium-containing brine by a mixed solvent of N-isooctyl valeramide, N-ethyl-1-(4-pentyl cyclohexyl) carboxamide and N-(4-t-butyl cyclohexyl) caprylamide

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 30 | 6:1 | 41.65 | 2.66 | 0.12 | 0.0046 | 26.07 | 4.28 | 111.47 |
| | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 30 | 1:6 | 81.37 | 75.33 | 26.10 | 18.25 | 1.43 | 5.66 | 3.96 |

As can be seen from Table 28, the single-stage extraction rate of $Li^+$ was 41.65%, the single-stage extraction rate of $Mg^{2+}$ was 2.66%, the separation coefficient of lithium and magnesium was 26.07. The single-stage stripping rate of $Li^+$ was 81.37%, the single-stage stripping rate of $Mg^{2+}$ was 75.33%, the separation coefficient of lithium and magnesium after stripping was 1.43, the concentration of $Li^+$ in the stripping water phase was 0.41 g/L, and the mass ratio of magnesium to lithium was reduced to 3.96.

Embodiment 29

15 mL N-butyl pelargonamide as the extractant and 15 mL methylnonylketone as the synergistic extractant were added into a 100 mL ground conical flask, with the extractant accounting for 50% the volume of the organic phase. Into the ground conical flask was then added 6 mL salt lake brine of Embodiment 1, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 20 min. The mixed liquid was then transferred into a 100 mL plastic test tube, which was centrifuged in a LD5-10 benchtop centrifuge at a rotational speed of 4300 r/min for 8 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 20° C. for 20 min. The mixed liquid was then transferred into a 100 mL plastic test tube, which was centrifuged in a LD5-10 benchtop centrifuge at a rotational speed of 4300 r/min for 8 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 29.

TABLE 29

Two-phase separation profile of $Li^+$ and $Mg^{2+}$ in the brine of a salt lake in Qinghai province by a complex solvent of N-butyl pelargonamide and methylnonylketone

| Extraction | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
|  | 20 | 5:1 | 34.78 | 0.44 | 0.11 | 0.00088 | 121.14 | 0.71 | 86.14 |
| Stripping | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
|  | 20 | 1:5 | 80.18 | 68.04 | 20.23 | 10.64 | 1.90 | 1.14 | 0.60 |

As can be seen from Table 29, the single-stage extraction rate of $Li^+$ was 34.78%, the single-stage extraction rate of $Mg^{2+}$ was 0.44%, the separation coefficient of lithium and magnesium was 121.14. The single-stage stripping rate of $Li^+$ was 80.18%, the single-stage stripping rate of $Mg^{2+}$ was 68.04%, the separation coefficient of lithium and magnesium after stripping was 1.90, the concentration of $Li^+$ in the stripping water phase was 0.56 g/L, and the mass ratio of magnesium to lithium was reduced to 0.60.

Embodiment 30

15 mL N-isopentyl caprylamide as the extractant and 15 mL methyl laurate as the synergistic extractants were added into a 100 mL ground conical flask, with the extractant accounting for 50% the volume of the organic phase. Into the ground conical flask was then added 10 mL salt lake brine of Embodiment 1, wherein the volume ratio of the organic phase to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 20 min. The mixed liquid was then transferred into a 100 mL plastic test tube, which was centrifuged in a LD5-10 benchtop centrifuge at a rotational speed of 4200 r/min for 8 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 20 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 30.

As can be seen from Table 30, the single-stage extraction rate of $Li^+$ was 33.45%, the single-stage extraction rate of $Mg^{2+}$ was 1.35%, the separation coefficient of lithium and magnesium was 36.73. The single-stage stripping rate of $Li^+$ was 72.89%, the single-stage stripping rate of $Mg^{2+}$ was 61.85%, the separation coefficient of lithium and magnesium after stripping was 1.66, the concentration of $Li^+$ in the stripping water phase was 0.49 g/L, and the mass ratio of magnesium to lithium was reduced to 1.94.

Embodiment 31

15 mL N-isopentyl caprylamide, 14.85 mL N-isooctyl valeramide as the extractants and 0.15 mL 260 #solvent oil as the diluent were added into a 100 mL ground conical flask, with the extractants accounting for 99.5% the volume of the organic phase. Into the ground conical flask was then added 10 mL salt lake brine of Embodiment 1, wherein the volume ratio of the organic phase to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 0° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:6 to the organic phase. The ground conical flask was placed in a DF-101S heat collecting type thermostat magnetic stirrer for stripping and two-phase mixing at 0° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 31.

TABLE 30

Two-phase separation profile of $Li^+$ and $Mg^{2+}$ in the brine of a salt lake in Qinghai province by a complex solvent of N-isopentyl caprylamide and methyl laurate

| Extraction | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
|  | 20 | 3:1 | 33.45 | 1.35 | 0.17 | 0.0046 | 36.73 | 2.29 | 84.00 |
| Stripping | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
|  | 20 | 1:3 | 72.89 | 61.85 | 8.06 | 4.86 | 1.66 | 3.22 | 1.94 |

TABLE 31

Two-phase separation profile of $Li^+$ and $Mg^{2+}$ in the brine of a salt lake in Qinghai province by a complex system of N-isopentyl caprylamide, N-isooctyl valeramide and 260# solvent oil

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 0 | 3:1 | 76.13 | 1.94 | 1.06 | 0.0066 | 161.13 | 1.45 | 232.83 |
| | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 0 | 1:6 | 70.48 | 66.38 | 14.48 | 12.12 | 1.20 | 1.63 | 1.37 |

As can be seen from Table 31, the single-stage extraction rate of $Li^+$ was 76.13%, the single-stage extraction rate of $Mg^{2+}$ was 1.94%, the separation coefficient of lithium and magnesium was 161.13. The single-stage stripping rate of $Li^+$ was 70.48%, the single-stage stripping rate of $Mg^{2+}$ was 66.38%, the separation coefficient of lithium and magnesium after stripping was 1.20, the concentration of $Li^+$ in the stripping water phase was 2.15 g/L, and the mass ratio of magnesium to lithium was reduced to 1.37.

Embodiment 32

12 mL N-pentyl isopelargonamide, 12 mL N-cyclopentyl pelargonamide as the extractants and 6 mL tri-iso-octyl phosphate as the synergistic extractant were added into a 100 mL ground conical flask, with the extractants accounting for 80% the volume of the organic phase. Into the ground conical flask was then added 10 mL salt lake brine of Embodiment 1, wherein the volume ratio of the organic phase to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 100 mL plastic test tube, which was centrifuged in a LD5-10 benchtop centrifuge at a rotational speed of 4200 r/min for 8 min. When the interface was clear, the two phases were separated to get a post-extraction brine sample and an organic phase loaded with $Li^+$, $Mg^{2+}$. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 32.

TABLE 32

Two-phase separation profile of $Li^+$ and $Mg^{2+}$ in the brine of a salt lake in Qinghai province by a complex solvent of N-pentyl isopelargonamide, N-cyclopentyl pelargonamide and tri-iso-octyl phosphate

| | T/° C. | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 57.07 | 6.91 | 0.44 | 0.025 | 17.92 | 6.86 | 122.88 |
| | T/° C. | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:3 | 93.54 | 96.60 | 43.23 | 85.07 | 0.51 | 3.61 | 7.09 |

As can be seen from Table 32, the single-stage extraction rate of $Li^+$ was 57.07%, the single-stage extraction rate of $Mg^{2+}$ was 6.91%, the separation coefficient of lithium and magnesium was 17.92. The single-stage stripping rate of $Li^+$ was 93.54%, the single-stage stripping rate of $Mg^{2+}$ was 96.60%, the separation coefficient of lithium and magnesium after stripping was 0.51, the concentration of $Li^+$ in the stripping water phase was 1.07 g/L, and the mass ratio of magnesium to lithium was reduced to 7.09.

Embodiment 33

15 mL N-butyl pelargonamide as the extractant and 15 mL 2-propyl heptanol as the synergistic extractant were added into a 100 mL ground conical flask, with the synergistic extractant accounting for 50% the volume of the organic phase. Into the ground conical flask was then added 6 mL salt lake brine of Embodiment 1, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 20 min. The mixed liquid was then transferred into a 100 mL plastic test tube, which was centrifuged in a LD5-10 benchtop centrifuge at a rotational speed of 4200 r/min for 8 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 20° C. for 20 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 33.

magnetic stirrer for stripping and two-phase mixing at 0° C. for 20 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

TABLE 33

Two-phase separation profile of $Li^+$ and $Mg^{2+}$ in the brine of a salt lake in Qinghai province by a complex solvent of N-butyl pelargonamide and 2-propyl heptanol

| Extraction | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| | 20 | 5:1 | 32.64 | 0.65 | 0.097 | 0.0013 | 74.08 | 1.13 | 83.58 |
| Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:5 | 68.15 | 61.24 | 10.69 | 7.89 | 1.35 | 1.37 | 1.01 |

As can be seen from Table 33, the single-stage extraction rate of $Li^+$ was 32.64%, the single-stage extraction rate of $Mg^{2+}$ was 0.65%, the separation coefficient of lithium and magnesium was 74.08. The single-stage stripping rate of $Li^+$ was 68.15%, the single-stage stripping rate of $Mg^{2+}$ was 61.24%, the separation coefficient of lithium and magnesium after stripping was 1.35, the concentration of $Li^+$ in the stripping water phase was 0.44 g/L, and the mass ratio of magnesium to lithium was reduced to 1.01.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 34.

TABLE 34

Two-phase separation profile of $Li^+$ and $Mg^{2+}$ in the brine of a salt lake in Qinghai province by a complex solvent of N-isobutyl isopelargonamide and N,N-di-sec-octyl acetamide

| Extraction | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| | 20 | 5:1 | 48.48 | 0.63 | 0.19 | 0.0013 | 148.43 | 0.74 | 109.30 |
| Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| | 20 | 1:5 | 88.60 | 79.61 | 38.86 | 19.52 | 1.99 | 1.31 | 0.66 |

Embodiment 34

15 mL N-isobutyl isopelargonamide as the extractant and 15 mL N, N-di-sec-octyl acetamide as the synergistic extractant were added into a 100 mL ground conical flask, with the synergistic extractant accounting for 50% the volume of the organic phase. Into the ground conical flask was then added 6 mL salt lake brine of Embodiment 1, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 0° C. and extracted for 20 min. The mixed liquid was then transferred into a 100 mL plastic test tube, which was centrifuged in a LD5-10 benchtop centrifuge at a rotational speed of 4200 r/min for 8 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:5 to the organic phase. The ground conical flask was placed in a DF-101S heat collecting type thermostat As can be seen from Table 34, the single-stage extraction rate of $Li^+$ was 48.48%, the single-stage extraction rate of $Mg^{2+}$ was 0.63%, the separation coefficient of lithium and magnesium was 148.43. The single-stage stripping rate of $Li^+$ was 88.60%, the single-stage stripping rate of $Mg^{2+}$ was 79.61%, the separation coefficient of lithium and magnesium after stripping was 1.99, the concentration of $Li^+$ in the stripping water phase was 0.86 g/L, and the mass ratio of magnesium to lithium was reduced to 0.66.

Embodiment 35

12 mL N-isooctyl valeramide as the extractant, 15 mL N, N-diisooctyl acetamide as the synergistic extractant and 3 mL 260 #solvent oil as the diluent were added into a 100 mL ground conical flask, into which was then added 3 mL magnesium-containing brine, wherein the volume ratio of the organic phase to the brine was 10:1. In the magnesium-containing brine, the contents of $Li^+$, $Mg^{2+}$ and $Cl^-$ were 0.12, 123.11 and 359.76 g/L respectively, the mass ratio of magnesium to lithium equalled to 1005.01:1, the density of brine was 1.33 g/cm$^3$, and the pH value of the brine was 4.5. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 30° C. and extracted for 30 min. The mixed liquid was then transferred into a 100 mL plastic test tube, which was centrifuged in a LD5-10 benchtop centrifuge at a rotational speed of 4200 r/min for 7 min. When the interface was clear, the two phases were separated to get a post-extraction brine sample and an organic phase loaded with $Li^+$ and $Mg^{2+}$. The loaded organic phase was transferred into another 100 mL ground conical flask, into which was added deionized water at a volume ratio of 1:20 to the organic phase. The ground conical flask was placed in a DF-101S heat collecting type thermostat magnetic stirrer for stripping and two-phase mixing at 30° C. for 30 min. The mixed liquid was then transferred into a 100 mL plastic test tube, which was centrifuged in a LD5-10 benchtop centrifuge at a rotational speed of 4200 r/min for 7 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 35.

interface was clear, the two phases were separated to get a post-extraction loaded organic phase and a remaining brine phase. A three-stage countercurrent extraction was then conducted according to extraction cascade crossover operation steps to get a loaded organic phase and a remaining brine phase after the three-stage countercurrent extraction.

The loaded organic phase after the three-stage countercurrent extraction was transferred into another 100 mL ground conical flask, into which was then added deionized water at a volume ratio of 1:6.6 to the organic phase. The ground conical flask was placed in a DF-101S heat collecting type thermostat magnetic stirrer for single-stage stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

TABLE 35

Two-phase separation profile of $Li^+$ and $Mg^{2+}$ in magnesium-containing brine by a complex system of N-isooctyl valeramide, N,N-diisooctyl acetamide and 260# solvent oil

| Extraction | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
|  | 30 | 10:1 | 68.74 | 4.15 | 0.22 | 0.0043 | 50.75 | 60.70 | 3081.18 |
| Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
|  | 30 | 1:20 | 75.00 | 71.92 | 59.43 | 50.74 | 1.17 | 68.17 | 58.20 |

As can be seen from Table 35, the single-stage extraction rate of $Li^+$ was 68.74%, the single-stage extraction rate of $Mg^{2+}$ was 4.15%, the separation coefficient of lithium and magnesium was 50.75. The single-stage stripping rate of $Li^+$ was 75.00%, the single-stage stripping rate of $Mg^{2+}$ was 71.92%, the separation coefficient of lithium and magnesium after stripping was 1.17, the concentration of $Li^+$ in the stripping water phase was 0.12 g/L, and the mass ratio of magnesium to lithium was reduced to 58.20.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 36.

TABLE 36

Three-stage countercurrent extraction and single-stage stripping profiles of $Li^+$ and $Mg^{2+}$ in the brine of a salt lake in Qinghai province by a solvent of N-isooctyl valeramide

| Three-stage Countercurrent | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
|  | 20 | 3:1 | 94.06 | 4.77 | 5.28 | 0.017 | 316.14 | 2.87 | 908.53 |
| Single-stage Stripping | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
|  | 20 | 1:6.6 | 73.57 | 21.58 | 18.30 | 1.81 | 10.11 | 8.53 | 0.84 |

Embodiment 36

30 mL N-isooctyl valeramide was added into a 100 mL ground conical flask as an extractant, into which was then added 10 mL salt lake brine of Embodiment 1, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the As can be seen from Table 36, after a three-stage countercurrent extraction of brine, the extraction rate of $Li^+$ was 94.06%, the extraction rate of $Mg^{2+}$ was 4.77%, the separation coefficient of lithium and magnesium reached 316.14. The single-stage stripping rate of $Li^+$ was 73.57%, the single-stage stripping rate of $Mg^{2+}$ was 21.58%, the separation coefficient of lithium and magnesium after stripping was 10.11, the concentration of $Li^+$ in the stripping water phase was 3.04 g/L, the mass ratio of magnesium to lithium was reduced to 0.84, and $Li^+$ and $Mg^{2+}$ in the brine were effectively separated. The more stages of the multi-stage countercurrent extraction, the higher the extraction rate of $Li^+$ in the brine, and the larger the separation coefficient of lithium and magnesium. In the case of reduced consumption of water phase, the more stage in the multi-stage countercurrent stripping, the more beneficial it was to the increase of the concentration of $Li^+$ in the post-stripping water phase.

The post-stripping organic phase was returned to the pre-extraction brine phase and remixed to realize the recycling of the extractant.

The water phase solution obtained after stripping was then subjected to oil removal and secondary evaporation, thus being concentrated to a $Li^+$ concentration of 30 g/L. After then, solutions of calcium chloride and barium chloride were separately added to completely precipitate and remove the sulfate radicals therein, and solutions of sodium carbonate and sodium hydroxide were separately added to completely precipitate and remove $Mg^{2+}$ therein. Then, the remaining solution was allowed to be evaporated, concentrated, cooled, crystallized, filtered and dried to get anhydrous lithium chloride product.

The concentrate of lithium chloride obtained after impurity removal was placed in an ion-exchange membrane electrolyzer for electrolysis. A lithium hydroxide solution with a mass concentration of 12% was obtained at the cathode, which was concentrated and crystallized to get a lithium hydroxide monohydrate. The lithium hydroxide monohydrate was washed with water and dried to get an anhydrous lithium hydroxide product, as well as the byproducts hydrogen gas and chlorine gas, which further react with each other to produce hydrochloric acid.

Embodiment 37

15 mL N-(3-pentyl) caprylamide and 15 mL N-isooctyl valeramide were added into a 100 mL ground conical flask as the extractants, into which was then added 10 mL salt lake brine of Embodiment 10, wherein the volume ratio of the extractants to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 10° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. A three-stage countercurrent extraction was then conducted according to extraction cascade crossover operation steps to get a loaded organic phase and a remaining brine phase after the three-stage countercurrent extraction.

The loaded organic phase after the three-stage countercurrent extraction was transferred into another 100 mL ground conical flask, into which was added deionized water at a volume ratio of 1:4 to the organic phase. The ground conical flask was placed in a DF-101S heat collecting type thermostat magnetic stirrer for single-stage stripping and two-phase mixing at 10° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase. A two-stage countercurrent stripping was then conducted according to cascade crossover operation steps to get an organic phase and a water phase after the two-stage countercurrent stripping.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 37.

TABLE 37

Three-stage countercurrent extraction and two-stage countercurrent stripping profiles of $Li^+$ and $Mg^{2+}$ in the brine of a salt lake in Qinghai province by a mixed solvent of N-(3-pentyl) caprylamide and N-isooctyl valeramide

| Three-stage Countercurrent | T/° C. | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) |
|---|---|---|---|---|---|---|---|---|---|
|  | 10 | 3:1 | 75.21 | 0.94 | 1.01 | 0.0032 | 318.12 | 0.25 | 81.32 |
| Two-stage Countercurrent Stripping | T/° C. | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) |
|  | 10 | 1:4 | 80.54 | 90.32 | 16.56 | 37.33 | 0.44 | 0.13 | 0.29 |

As can be seen from Table 37, after a three-stage countercurrent extraction of brine, the extraction rate of $Li^+$ was 75.21%, the extraction rate of $Mg^{2+}$ was 0.94%, the separation coefficient of lithium and magnesium reached 318.12. After a two-stage countercurrent stripping of the loaded organic phase, the stripping rate of $Li^+$ was 80.54%, the stripping rate of $Mg^{2+}$ was 90.32%, the separation coefficient of lithium and magnesium after stripping was 0.44, the concentration of $Li^+$ in the stripping water phase was 4.62 g/L, and the mass ratio of magnesium to lithium was reduced to 0.29, and $Li^+$ and $Mg^{2+}$ in the brine were effectively separated.

The water phase solution obtained after stripping was then subjected to oil removal and secondary evaporation, thus being concentrated to a $Li^+$ concentration of 20 g/L. After then, solutions of calcium chloride and barium chloride were separately added to completely precipitate and remove the sulfate radicals therein, and solutions of sodium carbonate and sodium hydroxide were separately added to completely precipitate and remove $Mg^{2+}$ therein, to get a refined solution of lithium chloride. A solution of sodium carbonate at a concentration of 250 g/L was then added at 1.1 times the theoretical amount thereof, producing a lithium carbonate precipitate, which was filtered and dried to get a lithium carbonate product.

An emulsion of calcium hydroxide was added into the obtained lithium carbonate, heated and stirred intensely for solid-liquid reaction to produce a solution of lithium hydroxide and a precipitate of calcium carbonate. After the separation of two phases, a solution of lithium hydroxide was obtained, which was concentrated at reduced pressure, crystallized and dried at 130 to 140° C. to produce lithium hydroxide monohydrate, and then heated at 150 to 180° C. and at reduced pressure to produce an anhydrous lithium hydroxide product.

Comparative Embodiment 1

30 mL N, N-di-sec-octyl acetamide (a kind of tertiary amides) was added into a 100 mL ground conical flask as an extractant, into which was then added 10 mL salt lake brine of Embodiment 1, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 38.

TABLE 38

Two-phase separation profile of $Li^+$ and $Mg^{2+}$ in the brine of a salt lake in Qinghai province by a solvent of N,N-di-sec-octyl acetamide

| Extraction | T/° C. | O/A | E($Li^+$)/% | E($Mg^{2+}$)/% | D($Li^+$) | D($Mg^{2+}$) | β($Li^+$/$Mg^{2+}$) | $m_o$($Mg^{2+}$)/$m_o$($Li^+$) | $m_w$($Mg^{2+}$)/$m_w$($Li^+$) |
|---|---|---|---|---|---|---|---|---|---|
|  | 20 | 3:1 | 2.98 | 0.60 | 0.010 | 0.0020 | 5.20 | 11.42 | 58.06 |
| Stripping | T/° C. | A/O | S($Li^+$)/% | S($Mg^{2+}$)/% | $D_s$($Li^+$) | $D_s$($Mg^{2+}$) | $β_s$($Li^+$/$Mg^{2+}$) | $m_{so}$($Mg^{2+}$)/$m_{so}$($Li^+$) | $m_{sw}$($Mg^{2+}$)/$m_{sw}$($Li^+$) |
|  | 20 | 1:3 | 57.64 | 78.19 | 4.07 | 10.72 | 0.38 | 5.87 | 15.48 |

As can be seen from Table 38, the single-stage extraction rate of $Li^+$ here was not high, only 2.98%, indicating that this kind of tertiary amide solvent has little ability to extract $Li^+$ in the salt lake brine, creating a significant contrast with the separation effect of lithium and magnesium in the salt lake brine when using a secondary amide as the extractant. This comparative embodiment is used as a counter example to the previous embodiment to further illustrate the extraction capacity of the secondary amide.

Comparative Embodiment 2

30 mL N, N-diisooctyl acetamide (a kind of tertiary amides) was added into a 100 mL ground conical flask as an extractant, into which was then added 10 mL salt lake brine of Embodiment 1, wherein the volume ratio of the extractant to the salt lake brine was 3:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method and EDTA volumetric titration method were respectively used, keeping the brine phase and the water phase in the processes of extraction and stripping in constant volume, preparing into analytical solutions, sampling and analyzing the concentrations of $Li^+$ and $Mg^{2+}$, thus calculating the experimental results as shown in Table 39.

TABLE 39

Two-phase separation profile of $Li^+$ and $Mg^{2+}$ in the brine of a salt lake in Qinghai province by a solvent of N,N-diisooctyl acetamide

| | T/° C. | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ |
|---|---|---|---|---|---|---|---|---|---|
| Extraction | 20 | 3:1 | 2.14 | 0.61 | 0.0073 | 0.0020 | 3.60 | 16.15 | 57.56 |
| | T/° C. | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ |
| Stripping | 20 | 1:3 | 16.58 | 19.49 | 0.60 | 0.73 | 0.82 | 15.59 | 18.99 |

As can be seen from Table 39, the single-stage extraction rate of $Li^+$ here was not high, only 2.14%, indicating that this kind of tertiary amide solvent has little ability to extract $Li^+$ in the salt lake brine, creating a significant contrast with the separation effect of lithium and magnesium in the salt lake brine when using a secondary amide as the extractant. This comparative embodiment is used as a counter example to the previous embodiment to further illustrate the extraction capacity of the secondary amide.

The foregoing are only some implementation cases provided for the selection of the invention, and the implementation mode of the invention shall not be limited to the above embodiments. For technicians in the field, various modifications and changes can be made to the disclosure. Any modifications, equivalent replacements, combinations and improvements made within the spirit and principle of the invention shall be included in the scope of the invention.

TABLE 40

Common designations, corresponding Canonical Names and Codes of secondary amides referred in the Embodiments

| Nos. | Common Designations of Partial Secondary Amides | Corresponding Canonical Names of Partial Secondary Amides | Codes |
|---|---|---|---|
| 1 | N-octyl isobutyramide | N-n-octyl-2-methyl propanamide | Z843 |
| 2 | N-butyl pelargonamide | N-n-butyl n-pelargonamide | Z491 |
| 3 | N-isobutyl isopelargonamide | N-(2-methyl propyl)-3,5,5-trimethyl caproamide | Z494 |
| 4 | N-pentyl caprylamide | N-n-pentyl n-caprylamide | Z581 |
| 5 | N-isopentyl caprylamide | N-(3-methyl butyl) n-caprylamide | Z582 |
| 6 | N-isopentyl isocaprylamide | N-(3-methyl butyl)-2-ethyl caproamide | Z584 |
| 7 | N-(3-pentyl) caprylamide | N-(1-ethyl propyl) n-caprylamide | Z585 |
| 8 | N-octyl valeramide | N-n-octyl n-valeramide | Z851 |
| 9 | N-isooctyl valeramide | N-(2-ethyl hexyl) n-valeramide | Z852 |
| 10 | N-isooctyl isovaleramide | N-(2-ethyl hexyl)-3-methyl butyramide | Z854 |
| 11 | N-ethyl lauramide | N-ethyl n-dodecanamide | Z2121 |
| 12 | N-pentyl isopelargonamide | N-n-pentyl-3,5,5-trimethyl caproamide | Z593 |
| 13 | N-sec-heptyl heptamide | N-(1-methyl hexyl)-n-heptamide | Z772 |
| 14 | N-isooctyl isocaproamide | N-(2-ethyl hexyl)-4-methyl valeramide | Z864 |
| 15 | N-dodecyl acetamide | N-n-dodecyl acetamide | Z1221 |
| 16 | N-isooctyl heptamide | N-(2-ethylhexyl)-n-heptamide | Z872 |
| 17 | N-isooctyl caprylamide | N-(2-ethylhexyl)-n-caprylamide | Z882 |
| 18 | N-isooctyl capramide | N-(2-ethylhexyl)-n-capramide | Z8102 |
| 19 | N-dodecyl isocaproamide | N-n-dodecyl-4-methyl valeramide | Z1263 |
| 20 | N-isooctyl-1-cyclopropyl carboxamide | N-(2-ethyl hexyl)-1-cyclopropyl carboxamide | Z84h2 |
| 21 | N-cyclopropyl capramide | N-cyclopropyln-capramide | Z3h101 |
| 22 | N-cyclopentyl isocaprylamide | N-cyclopentyl 2-ethyl-caproamide | Z5h83 |
| 23 | N-cyclohexyl heptamide | N-cyclohexyln-heptamide | Z6h71 |
| 24 | N-cyclopentyl pelargonamide | N-cyclopentyl n-pelargonamide | Z5h91 |
| 25 | N-ethyl-1-(4-pentyl cyclohexyl) carboxamide | N-ethyl-1-(4-n-pentyl cyclohexyl) carboxamide | Z212h1 |
| 26 | N-hexyl-3-cyclopentyl propanamide | N-n-hexyl-3-cyclopentyl propanamide | Z68h1 |
| 27 | N-cyclododecyl acetamide | N-cyclododecyl acetamide | Z12h21 |
| 28 | N-(4-t-butyl cyclohexyl) caprylamide | N-(4-t-butyl cyclohexyl) n-caprylamide | Z10h82 |

TABLE 41

Common designations, corresponding Canonical Names and CAS Nos. of synergistic extractants referred in the Embodiments*

| Nos. | Common Designations of Partial Synergistic Extractants | Corresponding Canonical Names of Partial Synergistic Extractants | CAS Nos. |
|---|---|---|---|
| 1 | methylnonylketone | 2-undecanone | 112-12-9 |
| 2 | methyl laurate | methyl n-dodecanoate | 111-82-0 |
| 3 | tri-iso-octyl phosphate | tri(2-ethyl hexyl) phosphate | 78-42-2 |
| 4 | 2-propyl heptanol | 2-n-propyl-1-n-heptanol | 10042-59-8 |
| 5 | N,N-di-sec-octyl acetamide | N,N-di(1-methyl heptyl) acetamide | 77934-47-5 |
| 6 | N,N-diisooctyl acetamide | N,N-di(2-ethyl hexyl) acetamide | 102769-39-1 |

*CAS Nos. refer to registration numbers in Chemical Abstract Service.

What is claimed is:

1. An extraction method for separating magnesium and extracting lithium from magnesium and lithium-containing brine with a secondary amide-type solvent, wherein, it comprises the following steps:
    S1. the magnesium and lithium-containing brine is taken as a pre-extraction brine phase; wherein, in the magnesium and lithium-containing brine, the concentration of lithium ions is 0.1~21 g/L, the concentration of magnesium ions is 80~125 g/L, the concentration of chloride ions is 200~400 g/L, the mass ratio of magnesium to lithium is 4.8~1100:1, the density of brine at 20° C. is 1.25~1.38 g/cm$^3$, and the pH value of the brine is between 1 and 7;
    S2. the secondary amide-type solvent is taken as a pre-extraction organic phase; wherein the secondary amide-type solvent contains secondary amides; the secondary amides consist of a single compound or a mixture of two or more compounds; wherein, the single compound has a structure as shown in Formula (I):

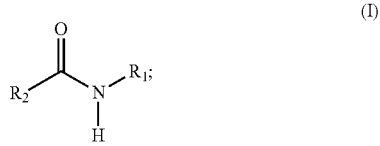

(I)

wherein, $R_1$ is selected from a C2~C12 alkyl or a C3~C12 cycloalkyl containing a single-ring structure, $R_2$ is selected from a C1~C11 alkyl or a C3~C11 cycloalkyl containing a single-ring structure, and the sum of the number of carbon atoms contained in the two groups $R_1$ and $R_2$ is 11~17, wherein the alkyl or the cycloalkyl comprises various isomers; when $R_1$ and $R_2$ are well-determined, the secondary amides is the single compound, while the mixture means a substance mixed by two or more compounds generated as a result of the variations of $R_1$ and $R_2$;
    and, the secondary amide-type solvent containing the secondary amide has a freezing point less than 0° C.;
    S3. the pre-extraction organic phase and the pre-extraction brine phase are mixed at a volume ratio of 1~10:1, and subjected to a single-stage extraction or a multi-stage countercurrent extraction, then subjected to a two-phase separation to get a loaded organic phase and a post-extraction brine phase.

2. The extraction method for separating magnesium and extracting lithium from magnesium and lithium-containing brine with the secondary amide-type solvent according to claim 1, wherein, the magnesium and lithium-containing brine also comprises one or more of sodium ions, potassium ions, ferric ions, ferrous ions, sulfate radicals, boric acid or borate ions.

3. The extraction method for separating magnesium and extracting lithium from magnesium and lithium-containing brine with the secondary amide-type solvent according to claim 1, wherein, the magnesium and lithium-containing brine comprises lithium-containing salt lake brine.

4. The extraction method for separating magnesium and extracting lithium from magnesium and lithium-containing brine with the secondary amide-type solvent according to claim 1, wherein, in the step S3, the extraction temperature is 0~50° C.; the two phases are mixed with stirring; after the extraction, the two phases are separated by centrifugation or settlement.

5. The extraction method for separating magnesium and extracting lithium from magnesium and lithium-containing brine with the secondary amide-type solvent according to claim 1, wherein, after the step S3, it further comprises the following steps:
    S4. with water as a stripping agent, the loaded organic phase is subjected to a single-stage stripping or a multi-stage countercurrent stripping, a volume ratio of the stripping agent to the loaded organic phase is 1:1~20, then the two phases are separated to get a post-stripping organic phase and a post-stripping water phase;
    wherein, in the step S4, the stripping temperature is 0~50° C.; the two phases are mixed with stirring; after the stripping, the two phases are separated by centrifugation or settlement;
    S5. the post-stripping organic phase is returned to the step S2 to realize the recycling of the extractant.

6. An application of the extraction method for separating magnesium and extracting lithium from magnesium and lithium-containing brine with the secondary amide-type solvent according to claim 5 in obtaining a lithium product lithium chloride, wherein, after the step S4, it further comprises the following steps:
    S6. the post-stripping water phase is further purified through oil removal, and concentrated; then an agent for removing impurities is added to remove the sulfate radicals and remaining magnesium ions therein, to get a lithium chloride solution after refining of the water phase; the agent for removing impurities is one or two or more of calcium oxide, calcium hydroxide, calcium chloride, barium chloride, sodium carbonate, sodium oxalate or sodium hydroxide;
    S7. a refined lithium chloride solution is subjected to concentration, crystallization, separation and drying to produce a lithium chloride product.

7. An application of the extraction method for separating magnesium and extracting lithium from magnesium and lithium-containing brine with the secondary amide-type solvent according to claim 5 in obtaining a lithium product lithium carbonate, wherein, after the step S4, it further comprises the following steps:
- S6. the post-stripping water phase is further purified through oil removal, and concentrated; then an agent for removing impurities is added to remove the sulfate radicals and remaining magnesium ions therein, to get a lithium chloride solution after refining of the water phase; the agent for removing impurities is one or two or more of calcium oxide, calcium hydroxide, calcium chloride, barium chloride, sodium carbonate, sodium oxalate or sodium hydroxide;
- S8. to a refined lithium chloride solution is added sodium carbonate to get a lithium carbonate precipitate, which is separated and dried to produce a lithium carbonate product.

8. An application of the extraction method for separating magnesium and extracting lithium from magnesium and lithium-containing brine with the secondary amide-type solvent according to claim 5 in obtaining a lithium product lithium hydroxide, wherein, after the step S4, it further comprises the following steps:
- S6. the post-stripping water phase is further purified through oil removal, and concentrated; then an agent for removing impurities is added to remove the sulfate radicals and remaining magnesium ions therein, to get a lithium chloride solution after refining of the water phase; the agent for removing impurities is one or two or more of calcium oxide, calcium hydroxide, calcium chloride, barium chloride, sodium carbonate, sodium oxalate or sodium hydroxide;
- S9. a refined lithium chloride solution is subjected to electrolysis, to produce a lithium hydroxide product; and byproducts including hydrogen gas and chlorine gas, and the hydrogen gas and the chlorine gas react with each other to produce hydrochloric acid;

or after the step S6, it further comprises the following steps:
- S8. to the refined lithium chloride solution is added sodium carbonate to get a lithium carbonate precipitate, which is separated and dried to produce a lithium carbonate product;
- S10. to the obtained lithium carbonate is added a calcium hydroxide emulsion for a solid-liquid reaction, then separated to get a lithium hydroxide solution, which is concentrated, crystallized and dried to produce a lithium hydroxide product.

9. The extraction method for separating magnesium and extracting lithium from magnesium and lithium-containing brine with the secondary amide-type solvent according to claim 1, wherein the secondary amide accounts for a volume percentage of 40~100%, including two endpoint values.

10. The extraction method for separating magnesium and extracting lithium from magnesium and lithium-containing brine with the secondary amide-type solvent according to claim 1, in the mixture of two or more compounds only consisting of the secondary amide, under the condition that components are miscible with each other, the volume percentage of any compound can be adjusted at will.

* * * * *